(12) United States Patent
Azumi et al.

(10) Patent No.: US 9,342,199 B2
(45) Date of Patent: May 17, 2016

(54) TOUCH DETECTION DEVICE, DISPLAY DEVICE WITH TOUCH DETECTION FUNCTION, AND ELECTRONIC APPARATUS

(71) Applicant: Japan Display Inc., Tokyo (JP)

(72) Inventors: Kohei Azumi, Tokyo (JP); Yoshitoshi Kida, Tokyo (JP)

(73) Assignee: Japan Display Inc., Tokyo (JP)

( * ) Notice: Subject to any disclaimer, the term of this patent is extended or adjusted under 35 U.S.C. 154(b) by 149 days.

(21) Appl. No.: 14/132,395

(22) Filed: Dec. 18, 2013

(65) Prior Publication Data

US 2014/0176496 A1    Jun. 26, 2014

(30) Foreign Application Priority Data

Dec. 26, 2012 (JP) .................................. 2012-283721
Mar. 29, 2013 (JP) .................................. 2013-075086

(51) Int. Cl.
*G06F 3/045* (2006.01)
*G06F 3/044* (2006.01)

(52) U.S. Cl.
CPC ...................................... *G06F 3/044* (2013.01)

(58) Field of Classification Search
CPC ..... G06F 3/047; G06F 3/044; G06F 3/03547; G06F 3/041; G06F 3/0412
USPC .................... 345/173, 174; 178/18.06–18.07, 178/18.01–18.03
See application file for complete search history.

(56) References Cited

U.S. PATENT DOCUMENTS

| 8,149,226 B2 * | 4/2012 | Oki ......................... G06F 3/044 178/18.01 |
| 9,046,969 B2 * | 6/2015 | Kamaeguchi .......... G06F 3/0416 |
| 2012/0044013 A1 * | 2/2012 | Muranaka ............. G06F 3/0418 327/517 |
| 2013/0321005 A1 * | 12/2013 | Hargreaves ................... 324/679 |
| 2014/0176473 A1 * | 6/2014 | Lin ........................ G06F 3/0418 345/173 |
| 2015/0205433 A1 * | 7/2015 | Mizuhashi ............ G06F 3/0416 345/174 |

FOREIGN PATENT DOCUMENTS

| JP | 2011-222013 | 11/2011 |
| JP | 2012-043275 | 3/2012 |
| TW | 201011620 | 3/2010 |

OTHER PUBLICATIONS

Office Action issued in connection with Taiwan Patent Application No. 102148031, dated Jun. 30, 2015. (9 pages).
Office Action issued in JP Application 2013-075086, mailed Mar. 22, 2016, 5 pages.

* cited by examiner

*Primary Examiner* — Rodney Amadiz
(74) *Attorney, Agent, or Firm* — K&L Gates LLP

(57) ABSTRACT

According to an aspect, a touch detection device includes a drive unit that supplies an excitation signal having at least variable magnitude to a first electrode at a predetermined period for detecting approach or a touch of an object; a detection unit electrically coupled to a second electrode provided to be opposed to the first electrode to detect approach or a touch of the object according to an output value from the second electrode; and an element that electrically couples the drive unit and the detection unit, receives the excitation signal from the drive unit, and has a predetermined size of electrostatic capacitance. The touch detection device corrects an output value from the second electrode by using an output value from the element and the output value from the second electrode obtained at the same timing.

24 Claims, 19 Drawing Sheets

TOUCH DETECTION DEVICE, DISPLAY DEVICE WITH TOUCH DETECTION FUNCTION, AND ELECTRONIC APPARATUS

CROSS REFERENCES TO RELATED APPLICATIONS

The present application claims priority to Japanese Priority Patent Application JP 2012-283721 filed in the Japan Patent Office on Dec. 26, 2012, and JP 2013-075086 filed in the Japan Patent Office on Mar. 29, 2013 the entire content of which is hereby incorporated by reference.

BACKGROUND

1. Technical Field

The present disclosure relates to a touch detection device capable of detecting an approaching external object, and a display device with a touch detection function and an electronic apparatus that include the touch detection device.

2. Description of the Related Art

In recent years, attention has been paid to a touch detection device referred to as so-called a touch panel, capable of detecting an object approaching externally. The touch detection device is combined with a display device, for example, and used for inputting information by displaying various types of images to be input on the display device. Combining the touch detection device with the display device may achieve inputting information without an input device such as a keyboard, a mouse, or a keypad.

Examples of touch detection type of a touch detection device include an optical type, a resistance type, and an electrostatic capacitance type. An electrostatic capacitance type touch detection device has a relative simple configuration and achieves low power consumption. The touch detection device is required to detect an approach or a touch of an object as reliably as possible. For example, Japanese Patent Application Laid-open Publication No. 2012-43275 (JP-A-2012-43275) discloses a technology for correcting variation in an input detection signal by providing a correction electrode and a correction detection electrode on positions having no influence of a finger touching the surface for operation.

With the technology disclosed in JP-A-2012-43275, drive voltages are sequentially supplied to drive lines, and then drive voltages are supplied to the correction electrode. Since this generates a time difference between detection of the object and correction of the input detection signal, there is a possibility that the object cannot be surely detected.

For the foregoing reasons, there is a need for a touch detection device, a display device with a touch detection function, and an electronic apparatus capable of suppressing reduction of detection accuracy of an approach or a touch of an object.

SUMMARY

According to an aspect, a touch detection device includes a drive unit that supplies an excitation signal having at least variable magnitude to a first electrode at a predetermined period for detecting approach or a touch of an object; a detection unit electrically coupled to a second electrode provided to be opposed to the first electrode to detect approach or a touch of the object according to an output value from the second electrode; and an element that electrically couples the drive unit and the detection unit, receives the excitation signal from the drive unit, and has a predetermined size of electrostatic capacitance. The touch detection device corrects an output value from the second electrode by using an output value from the element and the output value from the second electrode obtained at the same timing.

According to another aspect, a display device with a touch detection function has a touch detection device. The touch detection device includes a drive unit that supplies an excitation signal having at least variable magnitude to a first electrode at a predetermined period for detecting approach or a touch of an object; a detection unit electrically coupled to a second electrode provided to be opposed to the first electrode to detect approach or a touch of the object according to an output value from the second electrode; and an element that electrically couples the drive unit and the detection unit, receives the excitation signal from the drive unit, and has a predetermined size of electrostatic capacitance. The touch detection device corrects an output value from the second electrode by using an output value from the element and the output value from the second electrode obtained at the same timing.

According to another aspect, an electronic apparatus has a touch detection device. The touch detection device includes a drive unit that supplies an excitation signal having at least variable magnitude to a first electrode at a predetermined period for detecting approach or a touch of an object; a detection unit electrically coupled to a second electrode provided to be opposed to the first electrode to detect approach or a touch of the object according to an output value from the second electrode; and an element that electrically couples the drive unit and the detection unit, receives the excitation signal from the drive unit, and has a predetermined size of electrostatic capacitance. The touch detection device corrects an output value from the second electrode by using an output value from the element and the output value from the second electrode obtained at the same timing.

Additional features and advantages are described herein, and will be apparent from the following Detailed Description and the figures.

DETAILED DESCRIPTION

An embodiment for implementing the present disclosure will be described in detail in the following order with reference to the accompanying drawings.
1. Touch Detection Device
1-1. Overall Configuration
1-2. Basic Principle of Detecting Touch Operations
1-3. Correcting Output Values of Touch Detection Electrode
1-4. Examples of Circuit for Correction
1-5. Capacitor Arrangement
2. Application Examples
2-1. Display Device with Touch Detection Function
2-2. Electronic Apparatuses
3. Aspects of the Present Disclosure

1. TOUCH DETECTION APPARATUS 1-1. Overall Configuration

Figure 1:
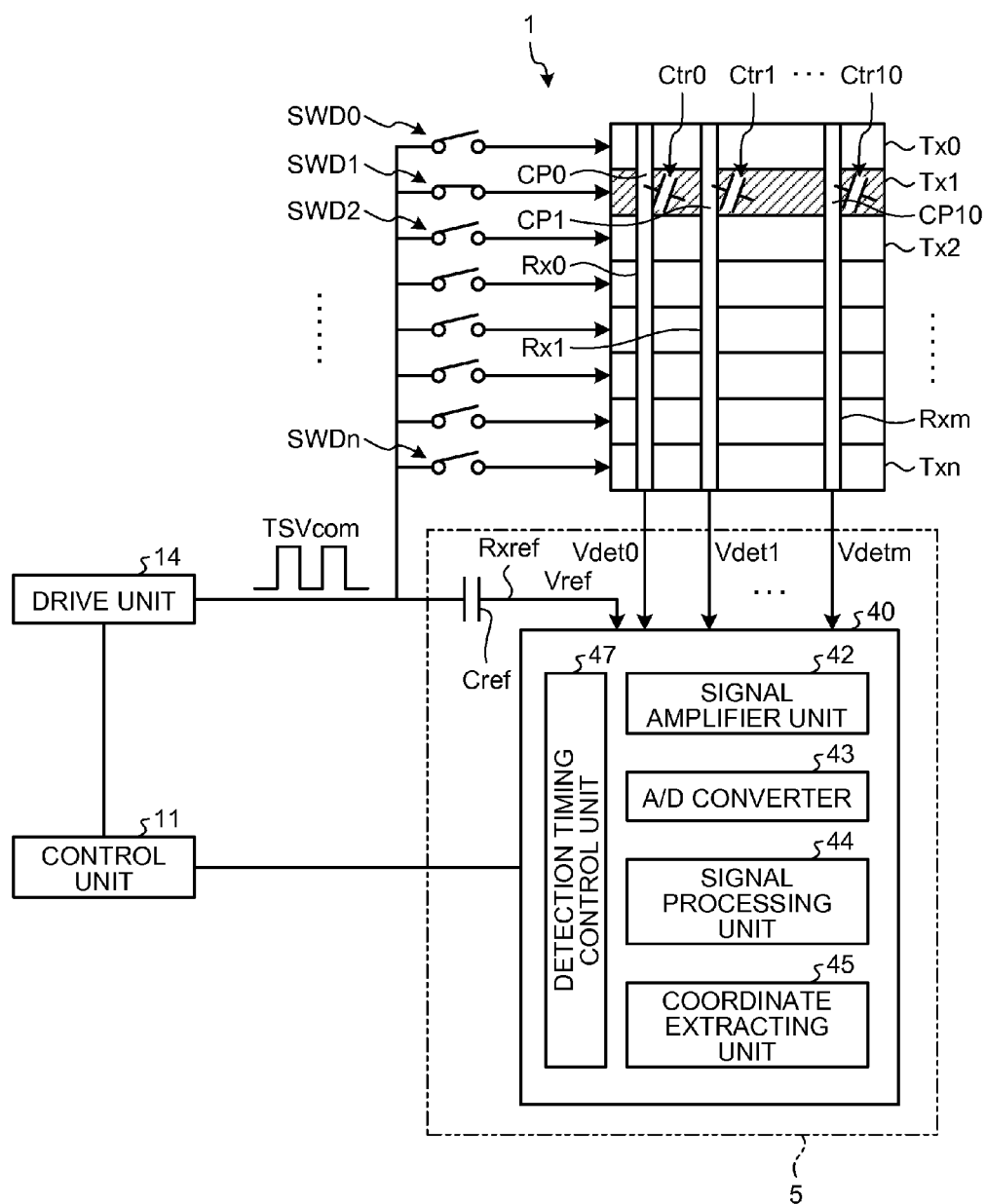
FIG. 1 is a diagram illustrating an example of a configuration of a touch detection device according to an embodiment.

FIG. 1 is a diagram illustrating an example of a configuration of the touch detection device according to the embodiment. This touch detection device 1 is an electrostatic capacitance type touch panel, for example. The touch detection device 1 includes drive electrodes $Tx0, Tx1, \ldots, Txn$ serving as first electrodes, touch detection electrodes $Rx0, Rx1, \ldots, Rx10$ serving as second electrodes, a capacitor Cref serving as an element, and a touch detection unit 40 serving as a touch detection unit.

The drive electrodes $Tx0, Tx1, \ldots, Txn$ are electrode patterns extending in a stripe in a predetermined direction (in the X direction in an X-Y coordinate system arbitrarily determined, in the description here), which are arranged in a direction perpendicular to the above-described predetermined direction (in a Y direction, in this example). Examples of the number of these arranged electrode patterns, i.e., the number of drive electrodes $Tx0, Tx1, \ldots, Txn$ include, but are not limited to, "n+1". When detecting an approach or a touch of an object (a finger, a touch pen, and so on) (hereinafter, referred to as a touch operation as necessary), signals for touch detection TSVcom are sequentially transmitted from a drive unit 14 to the respective drive electrodes $Tx0, Tx1, \ldots, Txn$. The drive unit 14 is an electronic circuit or an integral circuit (IC) that generates a signal for touch detection TSVcom.

The signal for touch detection TSVcom is an excitation signal having at least variable magnitude at a predetermined period, which is used for detecting an object approaching or touching the touch detection device 1. The signal for touch detection TSVcom may change its direction in addition to its magnitude. The drive electrodes $Tx0, Tx1, \ldots, Txn$ are hereinafter collectively referred to as a drive electrode Tx as necessary, if they need not to be distinguished from each other.

The touch detection electrodes $Rx0, Rx1, \ldots, Rx10$ are electrode patterns extending in a stripe in a direction perpendicular to the extending direction of each drive electrode Tx, that is, in the Y direction in the X-Y coordinate system. The touch detection electrodes $Rx0, Rx1, \ldots, Rx10$ only need to cross each drive electrode Tx and need not necessarily to be orthogonal to each drive electrode Tx. The electrode patterns of the touch detection electrodes $Rx0, Rx1, \ldots, Rx10$ are each electrically coupled to an input unit of a signal amplifier unit 42 of the touch detection unit 40. In the embodiment, examples of the number of touch detection electrodes $Rx0, Rx1, \ldots, Rx10$ include, but are not limited to, 11. The touch detection electrodes $Rx0, Rx1, \ldots, Rx10$ are hereinafter collectively referred to as a touch detection electrode Rx, if they need not to be distinguished from each other.

The portions where each drive electrode Tx and each touch detection electrode Rx cross each other, i.e., the cross portions CP0, CP1, . . . , CP10 generate electrostatic capacitances Ctr0, Ctr1 . . . , Ctr10, respectively. The number of cross portions CP0, CP1, . . . , CP10 per drive electrode Tx is 11; therefore, the number of electrostatic capacitances Ctr0, Ctr1 . . . , Ctr10 per drive electrode Tx is 11. The electrostatic capacitances Ctr0, Ctr1, . . . , Ctr10 are hereinafter collectively referred to as an electrostatic capacitance Ctr, if they need not to be distinguished from each other. The cross portions CP0, CP1, . . . , CP10 are hereinafter collectively referred to as a cross portion CP, if they need not to be distinguished from each other.

The touch detection unit 40 sequentially scans each drive electrode Tx according to the signal for touch detection TSVcom transmitted from the drive unit 14 and detects any touch operation. The touch detection electrode Rx outputs a touch detection signal Vdet for each drive electrode Tx and transmits the touch detection signal Vdet to the touch detection unit 40. As illustrated in FIG. 1, switches SWD1, SWD2, . . . , SWDn are provided between the drive unit 14 and the respective drive electrodes Tx0, Tx1, . . . , Txn. A control unit 11 sequentially turns On and Off the switches SWD1, SWD2, . . . , SWDn, thereby sequentially transmitting the respective signals for touch detection TSVcom to the drive electrodes Tx0, Tx1, . . . , Tx. The switches SWD1, SWD2, . . . , SWDn may be provided in the drive unit 14 or on a substrate (e.g., a glass substrate) where the drive electrodes Tx0, Tx1, . . . , Txn are provided.

The touch detection unit 40 detects the presence of a touch operation on the touch detection device 1 according to control signals supplied from the control unit 11 and the touch detection signal Vdet transmitted from the touch detection electrode Rx of the touch detection device 1. If a touch operation exists, the touch detection unit 40 obtains the coordinates of the position where the touch operation is detected in a touch detection area of the touch detection device 1. The touch detection unit 40 is an electronic circuit or an IC, for example. The control unit 11 is a device that controls operations of a display device or an electronic apparatus including the touch detection device 1.

The touch detection unit 40 includes a signal amplifier unit 42, an analog/digital (A/D) converter 43, a signal processing unit 44, a coordinate extracting unit 45, and a detection timing control unit 47. The signal amplifier unit 42 amplifies the touch detection signal Vdet transmitted from the touch detection electrode Rx of the touch detection device 1. The signal amplifier unit 42 may include a low-pass analog filter that eliminates a high-frequency component (a noise component) included in the touch detection signal Vdet, takes a touch component, and outputs the touch component. The A/D converter 43 samples analog signals output from the signal amplifier unit 42 at the timing synchronized with the signals for touch detection TSVcom and converts the sampled analog signals into digital signals.

The signal processing unit 44 includes a digital filter that eliminates a noise component included in an output signal of the A/D converter 43 to take a signal corresponding to a touch operation. This noise component has a higher frequency than the frequency sampled from the signals for touch detection TSVcom. The signal processing unit 44 detects presence of any touch on the touch detection device 1 according to an output signal of the A/D converter 43, for example (For example, the signal processing unit 44 may be a logic circuit).

If a touch operation is detected in the signal processing unit 44, the coordinate extracting unit 45 obtains the coordinates of the position where the touch operation is detected in the touch detection area of the touch detection device 1 (For example, the coordinate extracting unit 45 may be a logic circuit). The detection timing control unit 47 controls the signal amplifier unit 42, the A/D converter 43, the signal processing unit 44, and the coordinate extracting unit 45 so as to operate in a synchronized manner.

The capacitor Cref has a predetermined sized electrostatic capacitance, and electrically couples the drive unit 14 and the touch detection unit 40 serving as a detection unit to each other. Specifically, one end of the capacitor Cref is electrically coupled to an output terminal of the drive unit 14 and the other end of the capacitor Cref is electrically coupled to an input terminal of the signal amplifier unit 42 included in the touch detection unit 40. In the embodiment, the capacitor Cref is electrically coupled in the middle of the wiring Rxref that electrically couples the drive unit 14 and the touch detection unit 40 to each other. To the capacitor Cref, the excitation signal from the drive unit 14, that is, the signal for touch detection TSVcom is input. The signal for touch detection TSVcom is input to the capacitor Cref and the drive electrode Tx at the same timing, that is, in a synchronized manner. Specifically, the signal for touch detection TSVcom is input to the capacitor Cref and the drive electrode Tx0 at the same timing, then input to the capacitor Cref and the drive electrode Tx1 at the same timing, and repeatedly and sequentially input until being input to the drive electrode Txn in the same manner. The capacitor Cref may be electrically coupled to the respective drive electrodes Tx0 to Txn through the switches SWD0 to SWDn. In this example, when any one of the switches SWD0 to SWDn is turned On, the capacitor Cref, any one of the drive electrodes Tx0 to Txn, and the drive unit 14 are electrically coupled to each other. The size of the electrostatic capacitance of the capacitor Cref can be equivalent to the size of the electrostatic capacitance Ctr of the cross portion CP in the touch detection device 1, for example.

To an end of the capacitor Cref, the signal for touch detection TSVcom is input from the drive unit 14, thus from the other end of the capacitor Cref, an output value Vref corresponding to the signal for touch detection TSVcom is output. The output value Vref from the capacitor Cref is hereinafter referred to as a correction output value Vref, as necessary.

In the embodiment, the capacitor Cref is disposed on a different position from the area where the object of the touch detection device 1 is detected, specifically, from the area where the drive electrode Tx and the touch detection electrode Rx are disposed. For example, the capacitor Cref is disposed close to the touch detection unit 40 in the above-described area. In the embodiment, the capacitor Cref is mounted on a substrate 5 on which the touch detection unit 40 is mounted. The substrate 5 is a flexible print circuit (FPC), for example. The following describes the basic principle of detecting touch operations by the touch detection device 1 serving as an electrostatic capacitance type touch panel.

1-2. Basic Principle of Detecting Touch Operations

Figure 2:
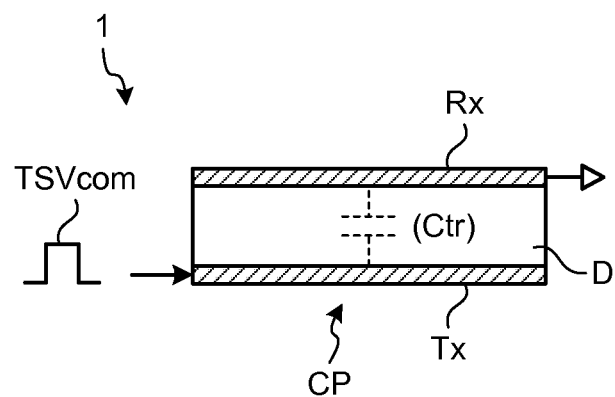
FIG. 2 is an explanatory diagram illustrating a state in which a finger does not approach or touch the touch detection device, for illustrating a basic principle of an electrostatic capacitance type touch detection method.
Figure 3:
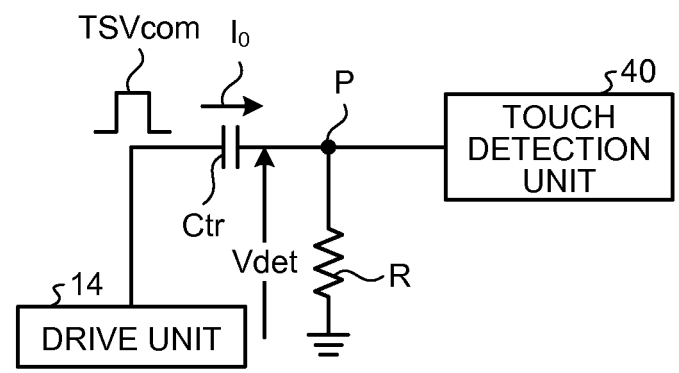
FIG. 3 is an explanatory diagram illustrating an example of an equivalent circuit in the state in which a finger does not approach or touch the touch detection device illustrated in FIG. 2.
Figure 4:
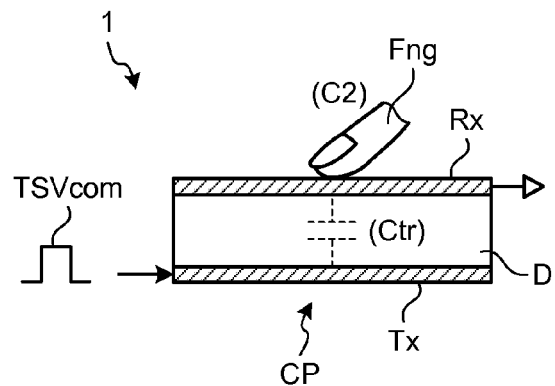
FIG. 4 is an explanatory diagram illustrating a state in which a finger approaches or touches the touch detection device for illustrating a principle of detecting touch operations.
Figure 5:
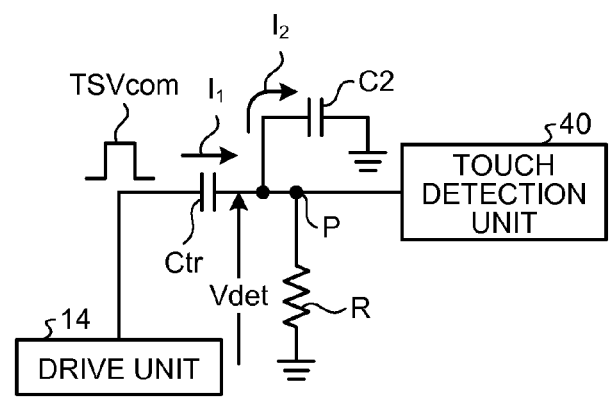
FIG. 5 is an explanatory diagram illustrating an example of an equivalent circuit in the state in which a finger approaches or touches the touch detection device illustrated in FIG. 3.
Figure 6:
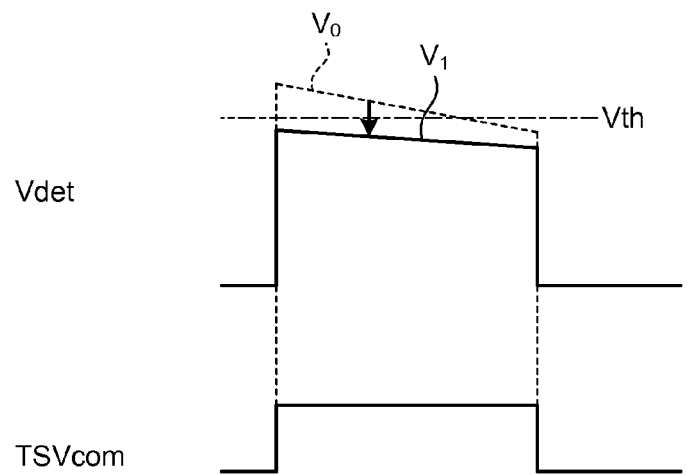
FIG. 6 is a diagram illustrating an example of waveforms of a signal for touch detection and a touch detection signal.

FIG. 2 is an explanatory diagram illustrating a state in which a finger does not approach or touch the touch detection device for illustrating the basic principle of the electrostatic capacitance type touch detection method. FIG. 3 is an explanatory diagram illustrating an example of an equivalent circuit in the state in which a finger does not approach or touch the touch detection device illustrated in FIG. 2. FIG. 4 is an explanatory diagram illustrating a state in which a finger approaches or touches the touch detection device for illustrating a principle of touch detection operation. FIG. 5 is an explanatory diagram illustrating an example of an equivalent circuit in the state in which a finger approaches or touches the touch detection device illustrated in FIG. 3. FIG. 6 is a diagram illustrating an example of waveforms of a signal for touch detection and a touch detection signal.

In the embodiment, as illustrated in FIGS. 2 and 4, the electrostatic capacitance Ctr of the cross portion CP in the touch detection device 1 includes the drive electrode Tx and the touch detection electrode Rx as a pair of electrodes disposed so as to be opposed to each other across a dielectric D, for example. As illustrated in FIGS. 3 and 5, one end of the electrostatic capacitance Ctr is coupled to the drive unit 14, and the other end P is grounded through a resistance R and electrically coupled to the touch detection unit 40.

When a predetermined frequency (e.g., several of kHz to several hundreds of kHz) of the signal for touch detection TSVcom is applied from the drive unit 14 to the drive electrode Tx (an end of the electrostatic capacitance Ctr), a touch detection signal Vdet appears as an output waveform on the touch detection electrode Rx (the side of the other end P of the electrostatic capacitance Ctr). In the state in which a finger does not touch (or approach) the touch detection device (untouched state), as illustrated in FIGS. 2 and 3, the discharging and charging of the electrostatic capacitance Ctr causes an electric current $I_0$ corresponding to the capacitance value of the electrostatic capacitance Ctr. The potential waveform at the other end P of the electrostatic capacitance Ctr appears like the waveform $V_0$ illustrated in FIG. 6, for example, which is detected by the touch detection unit 40 illustrated in FIG. 3.

In the state in which a finger touches (or approaches) the touch detection device (touched state), as illustrated in FIG. 4, the electrostatic capacitance C2 generated by the finger Fng serves as an element including an electrostatic capacitance so as to add itself to the electrostatic capacitance Ctr. In the equivalent circuit illustrated in FIG. 5, the electrostatic capacitance C2 is added to the electrostatic capacitance Ctr in series. In this state, the discharging and charging of the electrostatic capacitances Ctr and C2 causes electric currents $I_1$ and $I_2$, respectively. The potential waveform at the other end P of the electrostatic capacitance Ctr appears like the waveform $V_1$ illustrated in FIG. 6, for example, which is detected by the touch detection unit 40. The potential of the other end P is a divided voltage potential determined by the values of the electric currents $I_1$ and $I_2$ flowing through the electrostatic capacitances Ctr and C2 respectively. The waveform $V_1$ thus has a value smaller than that of the waveform $V_0$ in the untouched state. The touch detection unit 40 compares the detected voltage to a predetermined threshold voltage Vth. If the detected voltage is equal to or larger than the threshold voltage Vth, the touch detection unit 40 determines that the touch detection device 1 is in the untouched state, i.e., no touch operation is detected. If the detected voltage is less than the threshold voltage Vth, the touch detection unit 40 determines that the touch detection device 1 is in the touched state, i.e., a touch operation is detected. In this manner, the touch detection device 1 operates according to the basic principle of detection of touch operations, and the touch detection electrode Rx outputs the touch detection signal Vdet. The touch detection unit 40 can detect a touch operation based on the touch detection signal Vdet output by the touch detection electrode Rx.

1-3. Correcting Output Values of Touch Detection Electrode

The touch detection device 1 supplies the signal for touch detection TSVcom from the drive unit 14 to the drive electrode Tx, and the touch detection unit 40 detects the change in the touch detection signal Vdet as an output value from the touch detection electrode Rx, whereby a touch operation is detected. Such a device may involve an unexpected change in the touch detection signal Vdet in the state when an object does not approach the touch detection device 1, which is caused by a change in the power source or a change in temperature.

In the conventional technology, the magnitude of the change and the speed of the touch detection signal Vdet are detected and analyzed, and then the results are fed back to the touch detection unit 40 for correcting the touch detection signal Vdet. In the technology, however, the correction of the touch detection signal Vdet is delayed or shifted, whereby the correction accuracy may decrease. To address this, it is considerable that an electrode for correction is disposed in the area where an approach or a touch of an object is detected, for example. In this example, however, it is difficult to discriminate between the change in the touch detection signal Vdet caused by the approach of the object and that caused by other factors. For another example, it is considerable that the touch detection unit 40 and the drive unit 14 has a common power source. However, other issues occur like that the noise resulting from the temperature characteristics of a transistor can be hardly reduced; and integrating the touch detection device with the display device for using the common power source is difficult due to the difficulty of the layout thereof.

To address these issues, in the embodiment, the capacitor Cref is interposed between the drive unit 14 and the touch detection unit 40. The output value from the capacitor Cref (the correction output value Vref) and the output value from the touch detection electrode Rx (the touch detection signal Vdet) are obtained at the same timing, which are used for correcting the output value of the touch detection electrode Rx. The correction output value Vref and the touch detection signal Vdet are input to the touch detection unit 40.

The change in the correction output value Vref as an output value from the capacitor Cref is caused by a change in the power source included in the touch detection device 1, a change in temperature, or other changes. These changes do not depend on the presence of the object, and include many unexpected changes targeted for correction. The output value of the capacitor Cref (the correction output value) Vref and the object detected in the touch detection device 1 can be detected at the same time. Accordingly, using the correction output value Vref can suppress the delay or shift of the correction, whereby the touch detection signal Vdet from the touch detection electrode Rx can be accurately corrected. This correction will be described in detail below.

Figure 7A:
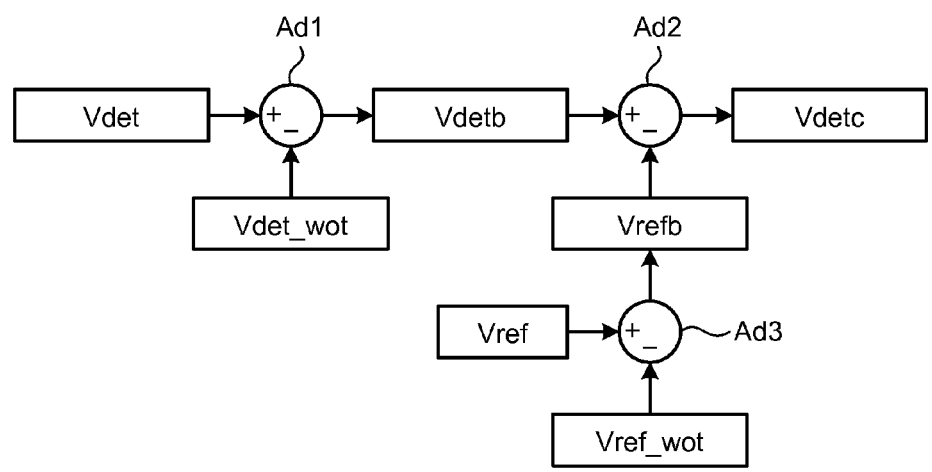
FIG. 7A is a schematic diagram illustrating a process for correcting an output value from a touch detection electrode.
Figure 7B:
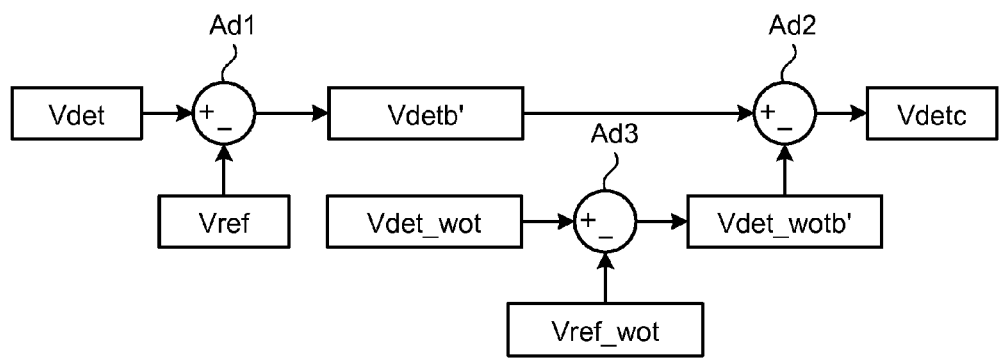
FIG. 7B is a schematic diagram illustrating a process for correcting an output value from the touch detection electrode.
Figure 8:
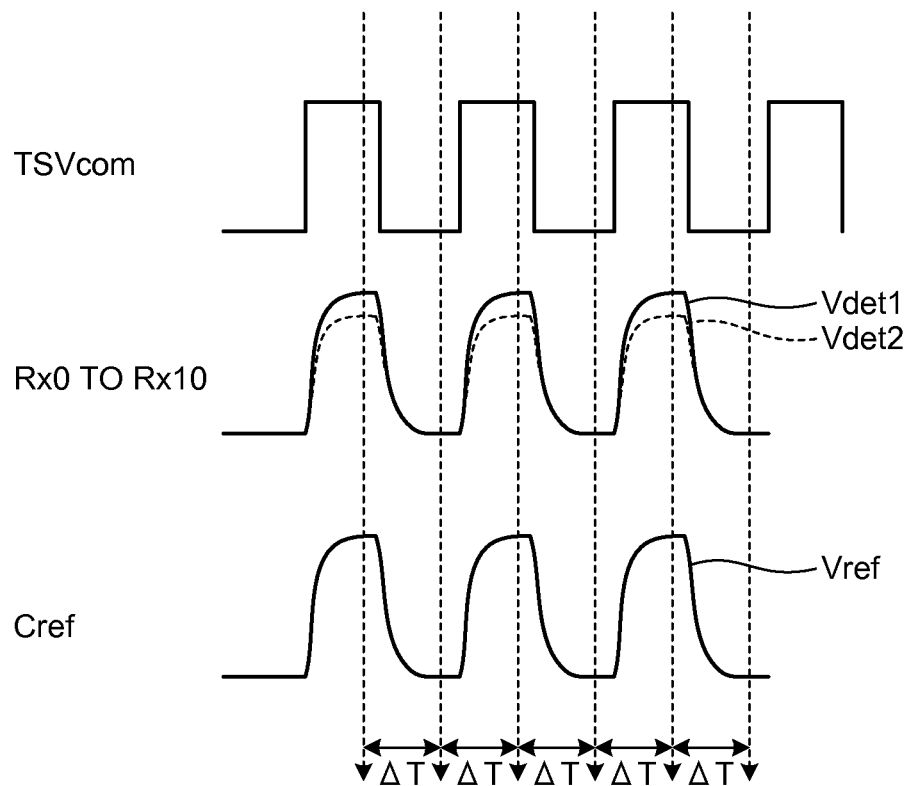
FIG. 8 is a diagram illustrating timing of obtaining output values from the touch detection electrode and a capacitor.

FIGS. 7A and 7B are schematic diagrams illustrating a process for correcting an output value from the touch detection electrode. FIG. 8 is a diagram illustrating timing of obtaining output values from the touch detection electrode and the capacitor. FIG. 8 illustrates touch detection signals Vdet1 and Vdet2 from the touch detection electrodes Rx0 to Rx10, and the correction output value Vref from the capacitor Cref. The touch detection signal Vdet1 is a signal when a touch operation is not detected, and the touch detection signal Vdet2 is a signal when a touch operation is detected. In FIG. 8, the horizontal axis represents the time and a plurality of straight dashed lines represent the time points at which the touch detection unit 40 obtains the data for each ΔT.

The process illustrated in FIG. 7A is performed by the touch detection device 1, more specifically, by the touch detection unit 40. As illustrated in FIG. 7A, an adder Ad1 adds the touch detection signal Vdet that is an output value from the touch detection electrode Rx and a touch detection signal Vdet_wot that is an output value output from the touch detection electrode Rx when no touch operation is detected. In the embodiment, the adder Ad1 adds the touch detection signal Vdet_wot and the touch detection signal Vdet_wot multiplied by −1. As a result, the difference therebetween is output as an output value Vdefb. A preliminarily obtained value stored in a storage unit of the touch detection unit 40 is used for the touch detection signal Vdet_wot when no touch operation is detected, for example.

An adder Ad2 adds the output value Vdetb from the adder Ad1 and an output value Vrefb from an adder Ad3. In the embodiment, the adder Ad2 adds the output value Vdetb and the output value Vref multiplied by −1. As a result, the difference therebetween is output as an output value (the correction touch detection signal) Vdetc. The output value Vrefb from the adder Ad3 is the difference between the correction output value Vref that is an output value from the capacitor Cref and an output value Vref_wot from the capacitor Cref when no touch operation is detected. In the embodiment, the adder Ad3 adds the correction output value Vref and the output value Vref_wot multiplied by −1. As a result, the difference therebetween is output as an output value Vdefb. The touch detection unit 40 compares the output value Vdetb and a predetermined threshold voltage Vth and detects the presence of a touch operation based on the compared result.

The process illustrated in FIG. 7B will now be described. The process is also performed by the touch detection device 1, more specifically, by the touch detection unit 40. As illustrated in FIG. 7B, the adder Ad1 adds the touch detection signal Vdet that is an output value from the touch detection electrode Rx and the correction output value Vref that is an output value from the capacitor Cref. In the embodiment, the adder Ad1 adds the touch detection signal Vdet and the correction output value Vref multiplied by −1. As a result, the difference therebetween is output as an output value Vdetb'.

The adder Ad2 adds the output value Vdetb' from the adder Ad1 and the output value Vdet_wotb' from the adder Ad3. In the embodiment, the adder Ad2 adds the output value Vdetb' and the output value Vdet_wotb' multiplied by −1. As a result, the difference therebetween is output as an output value (the correction touch detection signal) Vdetc. The output value Vdet_wotb' from the adder Ad3 is the difference between the touch detection signal Vdet_wot that is an output value output from the touch detection electrode Rx when no touch operation is detected, and the output value Vref_wot output from the capacitor Cref. In the embodiment, the adder Ad3 adds the Vdet_wot and the output value Vref_wot multiplied by −1. As a result, the difference therebetween is output as an output value Vdet_wotb'.

The touch detection signal Vdet from the touch detection electrode Rx includes information that the object such as a finger approaches or touches the touch detection device 1. The touch detection signal Vdet changes, for example, when the amplitude of the signal for touch detection TSVcom changes caused by a change in the power source of the touch detection device 1, etc. This change in the touch detection signal Vdet cannot be determined whether it is caused by the object or a noise. By contrast, the capacitor Cref is disposed on a different area from the area where the object is detected as described above, whereby the electrostatic capacitance does not change if the object approaches the area where the object is detected. As a result, as illustrated in FIG. 8, the correction output value Vref that is an output value from the capacitor Cref does not change due to the approach of the object, unlike the touch detection signals Vdet1 and Vdet2 from the touch detection electrodes Rx0 to Rxm. The change in the correction output value Vref therefore represents the change (shift) of the characteristics between the drive unit 14 and the touch detection unit 40 such as a change in the amplitude of the signal for touch detection TSVcom.

In the embodiment, the portion where the drive electrode Tx and the touch detection electrode Rx cross each other is determined as electrically the same as the capacitor Cref, and the output from the touch detection electrode Rx and the output from the capacitor Cref are obtained at the same timing. Subsequently, as described above, the correction output value Vref from the capacitor Cref or the output value Vrefb based thereon is subtracted from the touch detection signal Vdet from the touch detection electrode Rx (alternatively, the value subtracting the touch detection signal Vdet_wot from this value). The touch detection unit 40 uses the correction touch detection signal Vdetc obtained as described above, thereby eliminating the change caused by the change in the characteristics between the drive unit 14 and the touch detection unit 40 included in the touch detection signal Vdet. As a result, the touch detection unit 40 can suppress the reduction of detection accuracy of touch operations on the touch detection device 1. In other words, the touch detection unit 40 can suppress the reduction of detection accuracy of the object, thereby detecting the touch operations more reliably.

Figure 9:
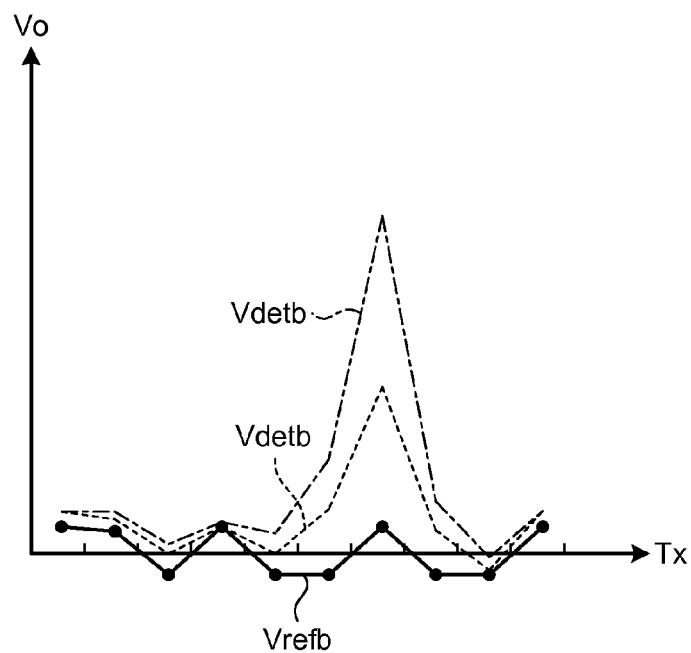
FIG. 9 is a diagram illustrating an example of touch detection signals when an output value from the touch detection electrode is not corrected.
Figure 10:
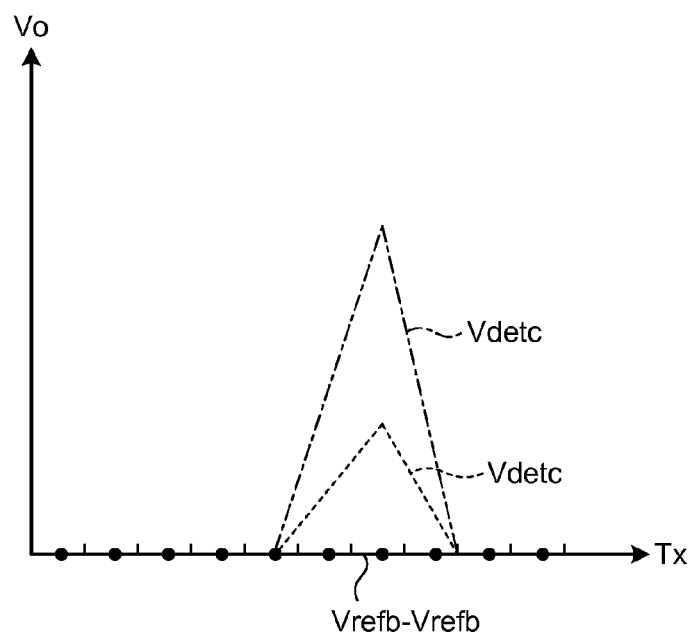
FIG. 10 is a diagram illustrating an example of touch detection signals when an output value from the touch detection electrode is corrected.

FIG. 9 is a diagram illustrating an example of the touch detection signal when an output value from the touch detection electrode is not corrected. FIG. 10 is a diagram illustrating an example of the touch detection signal when an output value from the touch detection electrode is corrected. The horizontal axes illustrated in FIGS. 9 and 10 correspond to the drive electrodes Tx0, Tx1, . . . , illustrated in FIG. 1 and the vertical axes indicate output values Vo from the touch detection electrode Rx and the capacitor Cref. The solid line illustrated in FIG. 9 indicates output values Vrefb that are the differences between the correction output values Vref and the output values Vref_wot. The dotted line illustrated in FIG. 9 indicates output values Vdetb that are the differences between the touch detection signals Vdet from the touch detection electrode Rx4 and the touch detection signals Vdet_wot. The alternate long and short dash line illustrated in FIG. 9 indicates output values Vdetb that are the differences of the correction output values Vdet output from the touch detection electrode Rx5 and the touch detection signals Vdet_wot. The dotted line illustrated in FIG. 10 indicates correction touch detection signals Vdetc from the adder Ad2, obtained by subtracting the output value Vrefb from the output value Vdetb output from the adder Ad1, for the touch detection electrode Rx4. The alternate long and short dash line illustrated in FIG. 10 indicates correction touch detection signals Vdetc output from the adder Ad2, obtained by subtracting the output value Vrefb from the output value Vdetb output from the adder Ad1, for the touch detection electrode Rx5. The solid line illustrated in FIG. 10 indicates values obtained by subtracting the output value Vrefb represented with the solid line illustrated in FIG. 9 from the output value Vrefb, which are theoretically 0.

If the touch detection signal Vdet from the touch detection electrode Rx is not corrected, as illustrated in FIG. 9, the influence of noises in the touch detection device or external noises appears on the touch detection signal Vdet other than noises caused by a touch operation. This may cause false detection of the object by the touch detection unit 40, that is, false detection of a touch operation. Through correction of the touch detection signal Vdet from the touch detection electrode Rx by using the correction output value Vref from the capacitor Cref, the influence of noise on the touch detection signal Vdet can be reduced as illustrated in FIG. 10. This increases the detection accuracy of touch operations by the touch detection unit 40.

Figure 11:
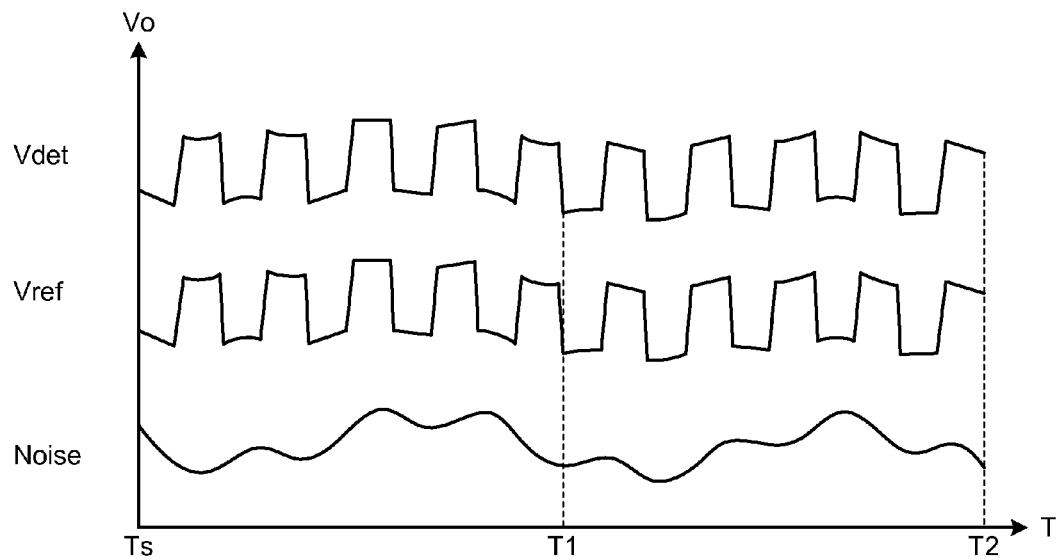
FIG. 11 is a diagram for illustrating timing of correcting output values from the touch detection electrode.
Figure 12:
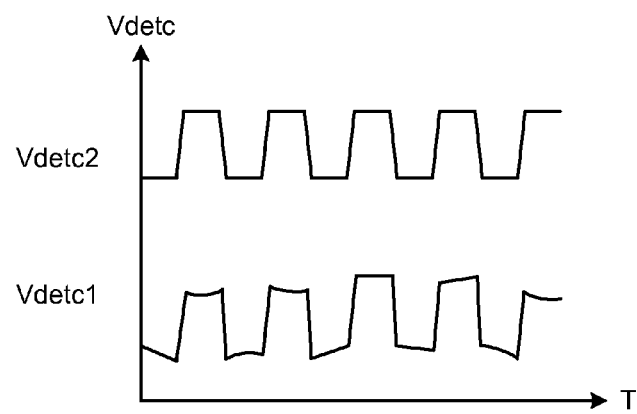
FIG. 12 is a diagram illustrating correction touch detection signals.

FIG. 11 is a diagram for illustrating timing of correcting output values from the touch detection electrode. FIG. 12 is a diagram illustrating a correction touch detection signal. The horizontal axes illustrated in FIGS. 11 and 12 indicate time T. The vertical axis illustrated in FIG. 11 indicates the value Vo, corresponding to the touch detection electrode Rx, the output value from the capacitor Cref and the noise. The vertical axis illustrated in FIG. 12 indicates the correction touch detection signal Vdetc. Two patterns of timing of correction are possible as follows. With the first pattern, in the example illustrated in FIG. 11, the correction output value Vref is obtained during the period from a time Ts to a time T1, and the touch detection signal Vdet is obtained during the period from the time T1 to a time T2 and corrected. That is, the touch detection signal Vdet is corrected by the correction output value Vref obtained at a timing other than the timing at which the touch detection signal Vdet is obtained. With the second pattern, in the example illustrated in FIG. 11, the correction output value Vref and the touch detection signal Vdet are obtained during the period from the time Ts to the time T1, and the correction is made. That is, the touch detection signal Vdet is corrected by the correction output value Vref obtained at the same timing as the timing when the touch detection signal Vdet is obtained.

As illustrated in FIG. 11, different noises appear at different times. Using the touch detection signal Vdet and the correction output value Vref obtained at the different timings like the above-described first pattern, the influence of the noise cannot be eliminated. As a result, the detection accuracy of an approach or a touch of the object by the touch detection unit 40 is reduced. Specifically, through correction of the touch detection signal Vdet after the signals for touch detection TSVcom are sequentially supplied from the drive unit 14 to the drive electrodes Tx0, Tx1, ..., Txn, the influence of noise cannot be eliminated like the touch detection signal Vdetc1 as illustrated in FIG. 12 due to the above-described reason. This reduces the detection accuracy of an approach or a touch of an object by the touch detection unit 40.

In the embodiment, the above-described second pattern is used. With the second pattern, as illustrated in FIG. 8, the correction output value Vref from the capacitor Cref and the touch detection signal Vdet from the touch detection electrodes Rx0 to Rx10 are obtained at the same timing. The touch detection signal Vdet is immediately corrected in real time by the correction output value Vref obtained at the same timing as the timing when the touch detection signal Vdet is obtained. In the example illustrated in FIG. 11, during the period from the time Ts to the time T1, the touch detection signal Vdet is corrected by the correction output value Vref obtained at the same timing as the timing when the touch detection signal Vdet is obtained. The touch detection signal Vdet and the correction output value Vref therefore undergo influence from the same noise, and thus have the same shape of waveform. As a result, using the touch detection signal Vdet and the correction output value Vref obtained at the same timing enables the touch detection unit 40 to eliminate the influence of noises, like the correction touch detection signal Vdetc2 illustrated in FIG. 12. This enables the touch detection unit 40 to suppress the reduction of detection accuracy of an approach or a touch of the object, thereby detecting the touch operations more reliably.

As described above, a change in the power source in the touch detection device 1 or a change in temperature may cause an unexpected change in the touch detection signal Vdet in the state where an object does not approach the touch detection device 1, resulting in false detection of a touch operation. This is greatly influenced by the noises caused by the different power sources and grounds between the touch detection unit 40 and the drive unit 14. The correction of the touch detection signal Vdet according to the embodiment is preferably made in particular when the touch detection unit 40 and the drive unit 14 are separated from each other as individual electronic parts and have different power sources and grounds. Examples of such electronic parts include an IC or an IC package. The correction of touch detection signal Vdet according to the embodiment may use different power sources and grounds, thereby increasing the flexibility of the layout of the touch detection device 1. For example, in-cell type touch panels use an electrode both as a drive electrode for detecting touch operations and as a common electrode for a display device. Such in-cell type touch panels may have difficulties in having the equal electrical characteristics and temperature characteristics between the touch detection unit and the drive unit due to the restriction of the layout. Applying the embodiment to in-cell type touch panels can therefore significantly increase the noise tolerance, thereby significantly increasing detection accuracy of touch operations.

The influence of temperature may cause an unexpected change in the touch detection signal Vdet. To address this, for example, the touch detection unit 40 and the drive unit 14 are achieved with the same IC, etc. Despite common use of the power source and ground by the touch detection unit 40 and the drive unit 14, the influence of the temperature is reduced, thereby accurately correcting the touch detection signal Vdet. As described above, the correction of the touch detection signal Vdet according to the embodiment is also preferably made when the touch detection unit 40 and the drive unit 14 are achieved with the same IC, etc.

In the embodiment, the capacitor Cref which is an external part is used as an element for correction, without the touch detection electrode Rx, and disposed at a position different from the positions of the touch detection electrode Rx and the drive electrode Tx. This configuration achieves distinguishing a change in the touch detection signal Vdet due to the approach of the object from the change in the touch detection signal Vdet due to other factors. In the embodiment, the capacitor Cref can be used under a relatively stable environment. This achieves stably correcting the touch detection signal Vdet and suppressing the reduction of detection accuracy of an approach or a touch of the object, whereby the touch operation can be detected more reliably. The following describes examples of a circuit for correction used for correcting the touch detection signal Vdet by the correction output value Vref.

1-4. Examples of Circuit for Correction

FIGS. 13A to 15 are diagrams illustrating examples of a circuit for correction. FIG. 16 is a timing chart of the circuit for correction illustrated in FIG. 15. The horizontal axis illustrated in FIG. 16 indicates the time T. The following describes an example of a first circuit illustrated in FIG. 13A, an example of a second circuit illustrated in FIG. 13B, an example of a third circuit illustrated in FIG. 14, and an example of a fourth circuit illustrated in FIG. 15, in this order. The following circuit examples may include a part of the touch detection unit 40 such as the signal amplifier unit 42, the A/D converter 43, and the signal processing unit 44.

Example of First Circuit

Figure 13A:
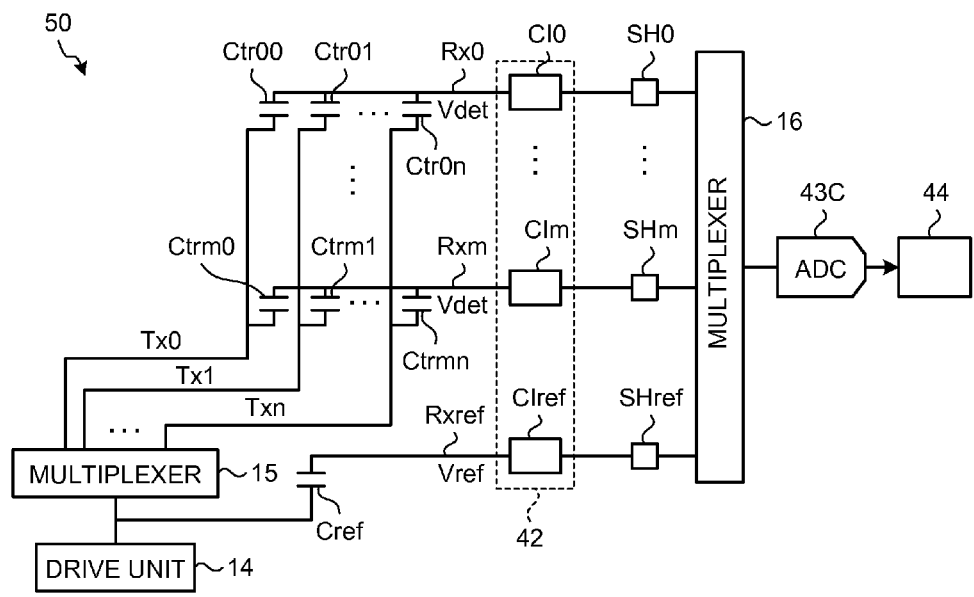
FIG. 13A is a diagram illustrating an example of a circuit for correction.

A circuit for correction (a correction circuit) 50 illustrated in FIG. 13A is an example circuit for achieving a correction process illustrated in FIG. 7A. In the correction circuit 50, electrostatic capacitances Ctr00, ..., Ctr0$n$, ..., Ctrm0, ..., Ctrmn are generated on the portions where the touch detection electrodes Rx0, ..., Rxm and the drive electrodes Tx0, Tx1, ..., Txn cross each other. In the correction circuit 50, the signal for touch detection TSVcom is input to each of the drive electrodes Tx0, Tx1, ..., Txn from the drive unit 14 through a multiplexer. The "m" and "n" added to the symbols Rx, Tx, and Ctr represent an integer not less than 0. The "m+1" represents the number of touch detection electrodes Rx, and the "n+1" represents the number of drive electrodes Tx. The same applies hereafter.

The output values from the touch detection electrodes Rx0, ..., Rxm are input to the signal amplifiers CI0, ..., CIm. In the correction circuit 50, the signal for touch detection TSVcom from the drive unit 14 is input to the capacitor Cref as it is. An output value from the capacitor Cref is input to a signal amplifier CIref. Output values from the signal amplifiers CI0, ..., CIm, and CIref (equivalent to the signal amplifier unit 42) are input to the sample holding circuits SH0, ..., SHm, and SHref, and then input from the sample holding circuits SH0, ..., SHm, and SHref through a multiplexer 16 to an analog digital converter (ADC) 43C. The ADC 43C is equivalent to the A/D converter 43 of the touch detection unit 40. The signal amplifiers CI0, ..., CIm, and CIm are integrating circuits, for example, in which an operational amplifier and a capacitor are combined with each other.

In the correction circuit 50, a multiplexer 15 sequentially switches the drive electrodes Tx0, Tx1, ..., Txn. The multiplexer 16 sequentially switches the touch detection electrodes Rx0, ..., Rxm. For example, if the multiplexer 15 selects the drive electrode Tx0, the touch detection signals Vdet from the touch detection electrodes Rx0, ..., Rxm are amplified by the signal amplifiers CI0, ..., CIm and input to the sample holding circuits SH0, ..., SHm, respectively. The correction output value Vref that is an output value from the capacitor Cref is amplified by the signal amplifier CIref and then input to the sample holding circuit SHref.

The multiplexer 16 sequentially switches the sample holding circuits SH0, ..., SHm, and SHref, and outputs the respective outputs to the ADC 43C. The signal processing unit 44 that has obtained the outputs from the ADC 43C calculates the differences between each output of the respective sample holding circuits SH0, ..., SHm (equivalent to the touch detection signal Vdet) and an output of the sample holding circuit SHref (equivalent to the correction output value Vref). Each output of the respective sample holding circuits SH0, ..., SHm is equivalent to the touch detection signal Vdet, and an output of the sample holding circuit SHref is equivalent to the correction output value Vref. Accordingly, the difference therebetween is the correction touch detection signal Vdetc. After the correction touch detection signal Vdetc for the drive electrode Tx0 is obtained, the multiplexer 15 sequentially switches the drive electrodes from Tx1 to Txn. The multiplexer 16 and the signal processing unit 44 obtain the correction touch detection signal Vdetc corresponding to each of the touch detection electrodes Rx0, ..., Rxm for the drive electrodes Tx1 to Txn in the same manner as the drive electrode Tx0. This enables the touch detection unit 40 to obtain the correction touch detection signals Vdetc corresponding to all of the touch detection electrodes Rx, thereby eliminating the influence of noise, suppressing the reduction of detection accuracy of an approach or a touch of the object, and detecting the touch operations more reliably.

If the correction circuit 50 does not have the multiplexer 16, the same number of ADC 43C are provided as the number of wiring Rxref of the capacitor Cref added to the number of touch detection electrodes Rx0, ..., Rxm, that is, m+2. The same applies in the examples hereafter.

Example of Second Circuit

Figure 13B:
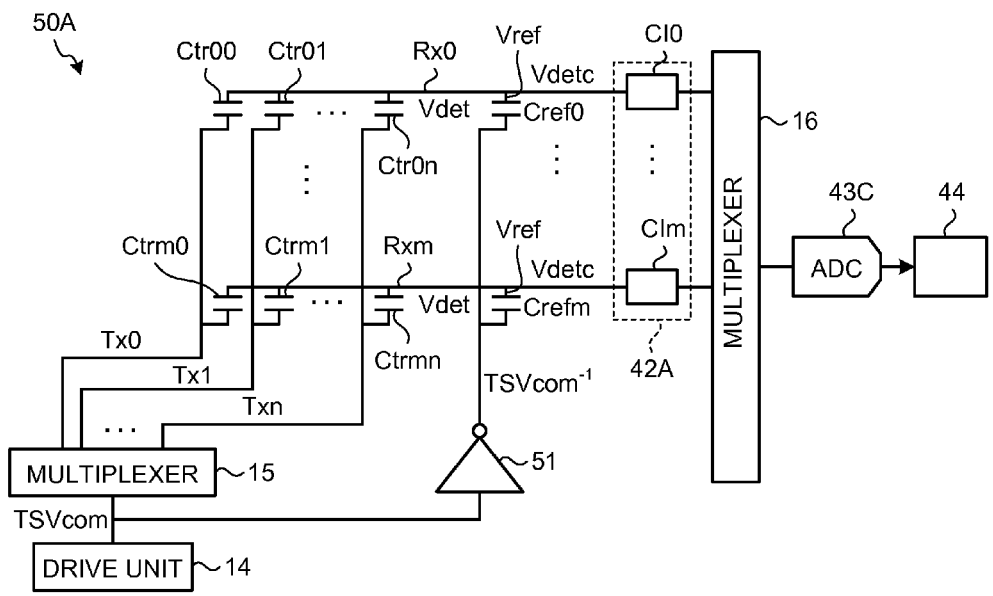
FIG. 13B is a diagram illustrating an example of a circuit for correction.

The second correction circuit 50A illustrated in FIG. 13B is an example circuit for achieving a correction process illustrated in FIG. 7B. The correction circuit 50A includes the capacitor Cref for each of the touch detection electrodes Rx0, ..., Rxm. That is, the correction circuit 50A has m capacitors Cref1, ..., Crefm. The signal for touch detection TSVcom from the drive unit 14 is inverted by the inverter 51 and then input to each of the capacitors Cref1, ..., Crefm. The inverted signal for touch detection is $TSVcom^{-1}$.

The sum of the touch detection signal Vdet that is an output value from the touch detection electrodes Rx0, ..., Rxm, and the correction output value Vref that is an output value from the capacitors Cref1, ..., Crefm is the correction touch detection signal Vdetc that is an output value from the touch detection electrode Rx. In this manner, the correction touch detection signal Vdetc obtained by subtracting the correction output value Vref from the touch detection signal Vdet can be obtained from each of the touch detection electrodes Rx0, ..., Rxm.

The correction touch detection signal Vdetc from each of the touch detection electrodes Rx0, ..., Rxm are amplified by the signal amplifiers CI0, ..., CIm (equivalent to the signal amplifier unit 42A) and then input to the multiplexer 16. The multiplexer 16 sequentially switches the touch detection electrodes Rx0, ..., Rxm, thereby outputting the amplified correction touch detection signal Vdetc through the ADC 43C to the signal processing unit 44. In this manner, the correction circuit 50A enables the touch detection unit 40 to obtain the correction touch detection signals Vdetc each corresponding to all of the touch detection electrodes Rx, thereby eliminating the influence of noise, suppressing the reduction of detection accuracy of an approach or a touch of the object, and detecting the touch operations more reliably.

Example of Third Circuit

Figure 14:
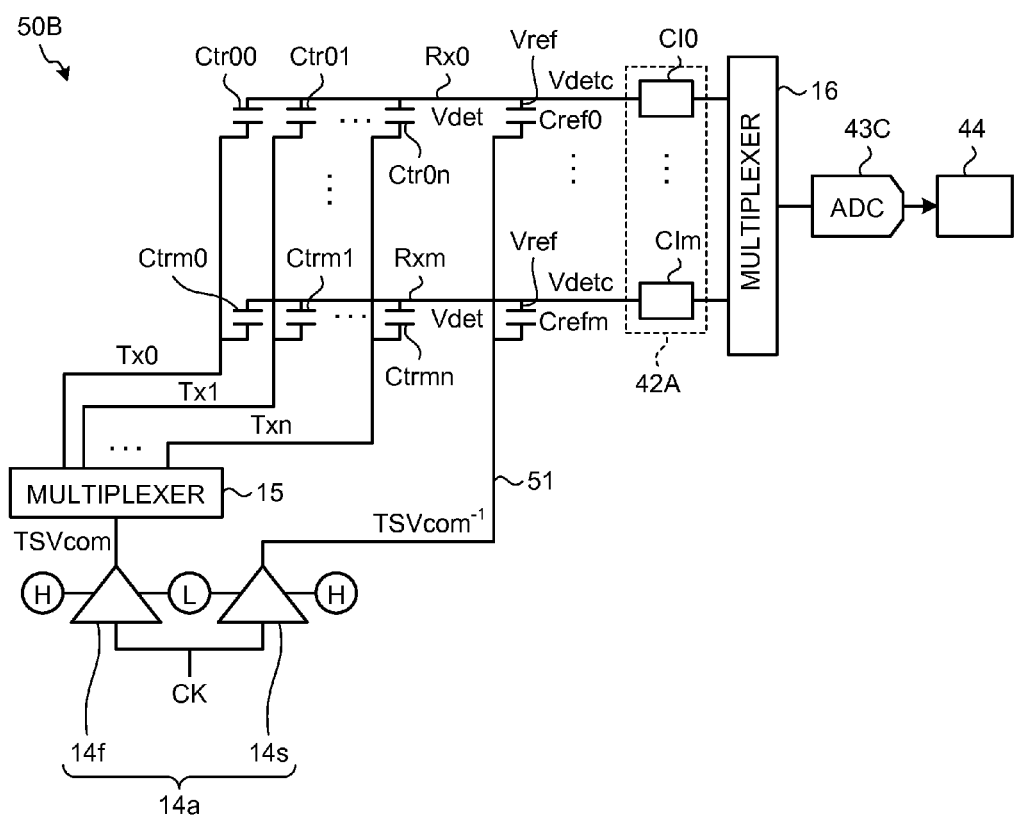
FIG. 14 is a diagram illustrating an example of a circuit for correction.

A correction circuit 50B illustrated in FIG. 14 is the same as the correction circuit 50 illustrated in FIG. 13B except for the technique of generating the signal for touch detection $TSVcom^{-1}$ inverted and input into the capacitor Cref. A drive unit 14a has a first drive unit 14f that generates the signal for touch detection TSVcom; and a second drive unit 14s serving as a circuit for inverting the phase of the signal for touch detection TSVcom generated by the first drive unit 14f by 180 degrees. The first drive unit 14f and the second drive unit 14s are circuits utilizing an operational amplifier, for example. The first drive unit 14f and the second drive unit 14s input a high (H) signal and a low (L) signal opposite to each other. Supplying a clock signal CK to the first drive unit 14f and the second drive unit 14s obtains the signal for touch detection TSVcom and the inverted signal for touch detection $TSVcom^{-1}$ in which the phase of the signal for touch detection TSVcom is inverted by 180 degrees. As a result, the correction touch detection signal Vdetc obtained by subtracting the correction output value Vref from the touch detection signal Vdet can be obtained. The correction circuit 50B has the same configuration of the signal amplifier unit 42A, the ADC 43C, and others as the correction circuit 50A, therefore descriptions thereof are omitted.

Example of Fourth Circuit

Figure 15:
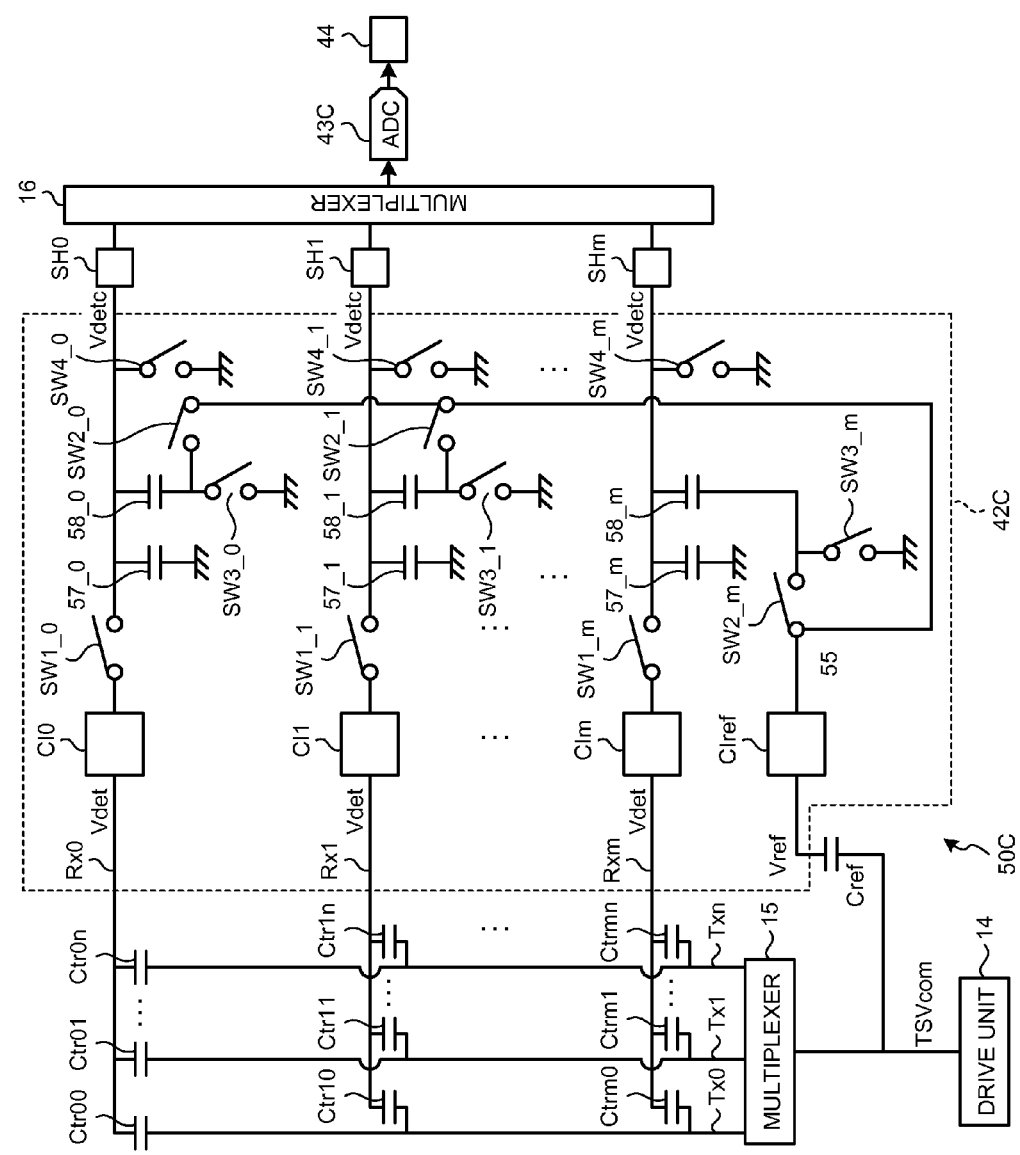
FIG. 15 is a diagram illustrating an example of a circuit for correction.
Figure 16:
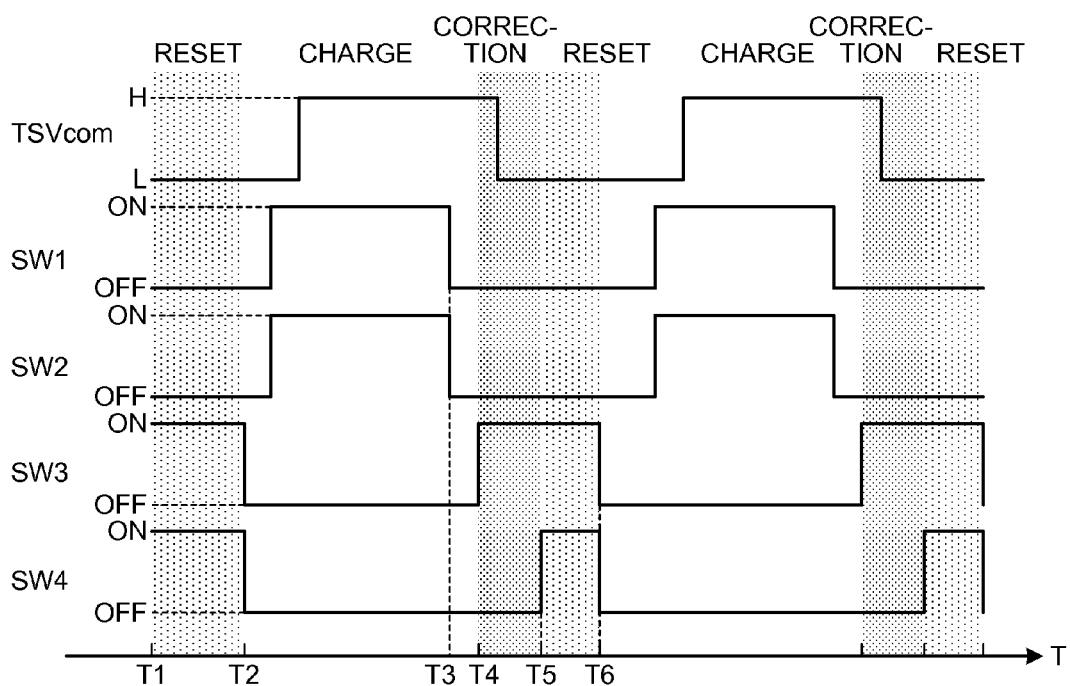
FIG. 16 is a timing chart of the circuit for correction illustrated in FIG. 15.

The correction circuit 50C illustrated in FIG. 15 corrects the touch detection signal Vdet by a holding circuit. In the correction circuit 50C, the signal for touch detection TSVcom from the drive unit 14 is input to the drive electrodes Tx0, Tx1, ..., Txn, and the capacitor Cref with the same phase. To the drive electrodes Tx0, Tx1, ..., Txn, the signal for touch detection TSVcom is input through the multiplexer 15. The electric charge from the touch detection electrode Rx is temporarily stored in first capacitors 57_0, 57_1, ..., 57_m and the electric charge in the capacitor Cref is temporarily stored in the second capacitors 58_0, 58_1, ..., 58_m. After that, the difference is obtained between the electric charge in the capacitor Cref and the electric charge from the touch detection electrode Rx. The obtained difference is used as the correction touch detection signal Vdetc, which is the correction value of the output value from the touch detection electrode Rx. In the embodiment, the first capacitors 57_0, 57_1, . . . , 57_m and the second capacitors 58_0, 58_1, . . . , 58_m are capacitors, but are not limited to this. They can be substituted with other components having an electric charge function. In the embodiment, the electrostatic capacitance is equal between the first capacitors 57_0, 57_1, . . . , 57_m and the second capacitors 58_0, 58_1, . . . , 58_m.

The signal amplifier unit 42C includes signal amplifiers CI0, . . . , CIm corresponding to the respective touch detection electrodes Rx0, Rx1, . . . , Rxm. Each of the signal amplifiers CI0, . . . , CIm has an integrating circuit including an operational amplifier and a capacitor, for example. The correction output value Vref output from the capacitor Cref is input to the signal amplifier CIref. The signal amplifiers CI0, . . . , CIm, CIref correspond to the signal amplifier unit 42C.

To the output parts of the signal amplifiers CI0, . . . , CIm, the first switches SW1_0, SW1_1, . . . , SW1_m are electrically coupled. The first switches SW1_0, SW1_1, . . . , SW1_m are electrically coupled to the input parts of the sample holding circuits SH0, . . . , SHm, respectively. That is, the signal amplifiers CI0, . . . , CIm are electrically coupled to the sample holding circuits SH0, . . . , SHm through the first switches SW1_0, SW1_1, . . . , SW1_m, respectively.

To the output part of the signal amplifier CIref to which the correction output value Vref output from the capacitor Cref is input, the second switches SW2_0, SW2_1, . . . , SW2_m are electrically coupled in parallel. The second switches SW2_0, SW2_1, . . . , SW2_m are electrically coupled between the first switches SW1_0, SW1_1, . . . , SW1_m, with the second capacitors 58_0, 58_1, . . . , 58_m interposed therebetween, and the sample holding circuits SH0, . . . , SHm.

The lines between the second switches SW2_0, SW2_1, . . . , SW2_m and the second capacitors 58_0, 58_1, . . . , 58_m are grounded through the third switches SW3_0, SW3_1, . . . , SW3_m, respectively. The lines between the second capacitors 58_0, 58_1, . . . , 58_m and the sample holding circuits SH0, . . . , SHm are grounded through the fourth switches SW4_0, SW4_1, . . . , SW4_m, respectively. The lines between the first switches SW1_0, SW1_1, . . . , SW1_m and the second capacitors 58_0, 58_1, . . . , 58_m are grounded through the first capacitors 57_0, 57_1, . . . , 57_m, respectively. The following describes operations of the correction circuit 50C with reference to FIG. 16.

In the correction circuit 50C, if the third switches SW3_0, SW3_1, . . . , SW3_m are turned On, the touch detection signal Vdet is corrected by the correction output value Vref. As illustrated in FIG. 15, if the fourth switches SW4_0, SW4_1, . . . , SW4_m are turned On, the electric charges stored in the first capacitors 57_0, 57_1, . . . , 57_m and the second capacitors 58_0, 58_1, . . . , 58_m flow toward the grounds, whereby the electric charges are 0. That is, if the fourth switches SW4_0, SW4_1, . . . , SW4_m are turned On, the correction circuit 50B is reset.

As illustrated in FIG. 16, the signal for touch detection TSVcom repeats an alternate high (H) and low (L) state at a predetermined period. The signal for touch detection TSVcom is input from the drive unit 14 to the drive electrodes Tx0, Tx1, . . . , Txn and the capacitor Cref. If the time T is T1 to T2, the correction circuit 50C is in a reset state because the fourth switches SW4_0, SW4_1, . . . , SW4_m are turned On. If the time T is T2, the fourth switches SW4_0, SW4_1, . . . , SW4_m and the third switches SW3_0, SW3_1, . . . , SW3_m are turned Off. In this state, if the first switches SW1_0, SW1_1, . . . , SW1_m and the second switches SW2_0, SW2_1, . . . , SW2_m are turned On at the same time, charging starts to the first capacitors 57_0, 57_1, . . . , 57_m and the second capacitors 58_0, 58_1, . . . , 58_m. On this occasion, electric charges are stored in the first capacitors 57_0, 57_1, . . . , 57_m. These electric charges correspond to the voltage of the touch detection signal Vdet output from the detection electrodes Rx0, Rx1, . . . , Rxm and processed by the signal amplifiers CI0, . . . , CIm and correspond to the electrostatic capacitance of the first capacitors 57_0, 57_1, . . . , 57_m. Other electric charges are stored in the second capacitors 58_0, 58_1, . . . , 58_m. These electric charges correspond to the voltage of the correction output value Vref output from the capacitor Cref and processed by the signal amplifier CIref, and correspond to the electrostatic capacitance of the second capacitors 58_0, 58_1, . . . , 58_m.

If the time T is T3, the first switches SW1_0, SW1_1, . . . , SW1_m and the second switches SW2_0, SW2_1, . . . , SW2_m are turned Off at the same time, thereby ending the charging to the first capacitors 57_0, 57_1, . . . , 57_m and the second capacitors 58_0, 58_1, . . . , 58_m. If the time T is T4, the third switches SW3_0, SW3_1, . . . , SW3_m are turned On. Accordingly, a part of the electric charges stored in the second capacitors 58_0, 58_1, . . . , 58_m flows toward the ground through the third switches SW3_0, SW3_1, . . . , SW3_m. As a result, a voltage is applied to each of the input parts of the sample holding circuits SH0, . . . , SHm. This voltage corresponds to the difference between the electric charges stored in the first capacitors 57_0, 57_1, . . . , 57_m and the electric charges stored in the second capacitors 58_0, 58_1, . . . , 58_m. As described above, the correction circuit 50C can correct the touch detection signal Vdet from the touch detection electrode Rx by the correction output value Vref from the capacitor Cref obtained at the same timing as the touch detection signal Vdet. More specifically, the correction circuit 50C can obtain the correction touch detection signal Vdetc corresponding to the difference between the touch detection signal Vdet and the correction output value Vref. To the sample holding circuits SH0, . . . , SHm, the correction touch detection signals Vdetc are input. The correction touch detection signals Vdetc are sequentially output by the multiplexer 16 through the ADC 43C to the signal processing unit 44.

If the time T is T5, the fourth switches SW4_0, SW4_1, . . . , SW4_m are turned On, and the correction circuit 50C is reset. If the time T is T6, the third switches SW3_0, SW3_1, . . . , SW3_m and the fourth switches SW4_0, SW4_1, . . . , SW4_m are turned Off, charging is again ready for the first capacitors 57_0, 57_1, . . . , 57_m and the second capacitors 58_0, 58_1, . . . , 58_m. After this, the charging, correction, and resetting described above are repeated.

The correction circuit 50C corrects the touch detection signal Vdet from the touch detection electrode Rx by a holding circuit for electric charge using the first capacitors 57_0, 57_1, . . . , 57_m and the second capacitors 58_0, 58_1, . . . , 58_m. The circuit configuration like this enables the correction circuit 50C to include only one capacitor Cref.

The three example correction circuits 50, i.e., the correction circuits 50A, 50B, 50C are described as examples of correction circuits in the embodiment. They are described merely for exemplary purpose and are not for limitation. For example, the touch detection unit 40 may calculate the touch detection signal Vdet and the correction output value Vref using digital values after being converted by the ADC 43C and obtain the correction touch detection signal Vdetc.

1-5. Capacitor Arrangement

As described above, the capacitor Cref is disposed on an area different from the area where the object to the touch detection device 1 is detected, specifically, different from the area where the drive electrode Tx and the touch detection electrode Rx are disposed. This can suppress the change in the electrostatic capacitance in the capacitor Cref caused by the object such as a finger approaching the touch detection electrode Rx. This increases the accuracy for correcting the touch detection signal Vdet.

The capacitor Cref is preferably disposed close to the touch detection unit 40. This can suppress the influence of external noise on the touch detection device 1 as much as possible. If the touch detection unit 40 is achieved with an electronics assembly integrating ICs or electronics, the capacitor Cref may be disposed in the touch detection unit 40. This can also suppress the influence of external noise on the touch detection device 1 as much as possible.

The capacitor Cref may be mounted on the substrate on which the touch detection unit 40 is mounted. This facilitates wiring arrangement to couple the touch detection unit 40 and the capacitor Cref to each other.

The wiring that electrically couples the capacitor Cref and the drive unit 14 is preferably longer than the wiring that electrically couples the capacitor Cref and the touch detection unit 40. This is because the impedance of the drive unit 14 is low and thus has a relatively small influence of external noise on the touch detection device 1. This enables the wiring that electrically couples the capacitor Cref and the drive unit 14 to be longer and the wiring that electrically couples the capacitor Cref and the touch detection unit 40 to be shorter. As a result, the capacitor Cref is disposed closer to the touch detection unit 40, thereby suppressing the influence of external noise on the touch detection device 1 as much as possible.

2. APPLICATION EXAMPLES

2-1. Display Device with Touch Detection Function

The following describes application examples in the present disclosure in which the above-described touch detection device 1 is applied to a display device with a touch detection function.

Figure 17:
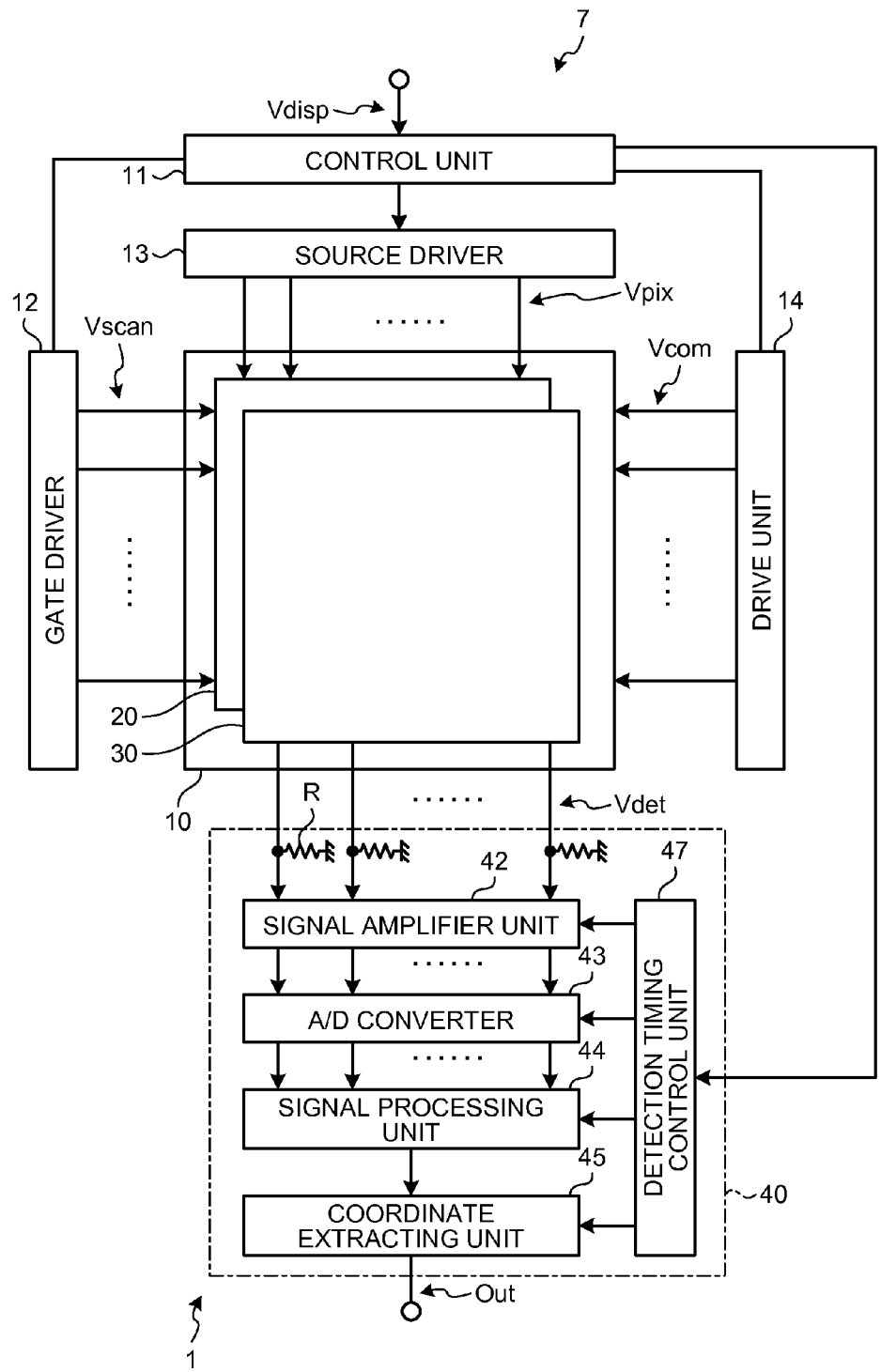
FIG. 17 is a diagram illustrating a display device with a touch detection function including the touch detection device according to the embodiment.
Figure 18:
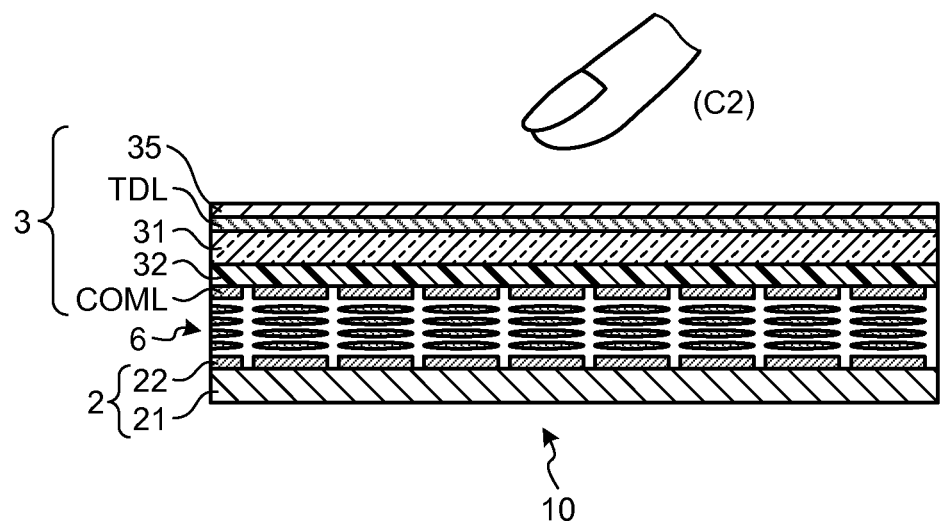
FIG. 18 is a cross-sectional view illustrating the schematic cross-sectional structure of the display device with a touch detection function including the touch detection device according to the embodiment.
Figure 19:
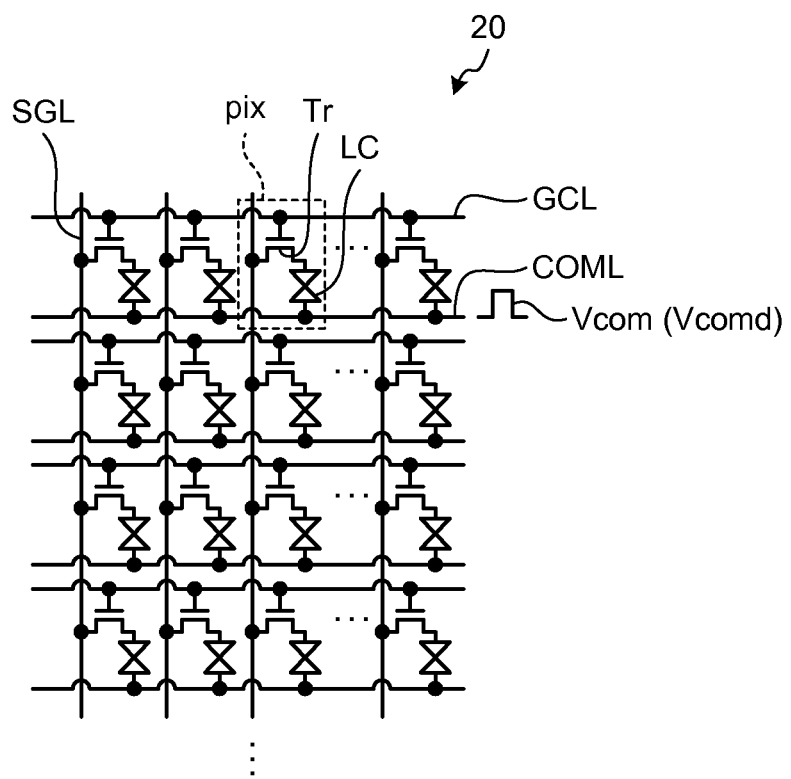
FIG. 19 is a circuit diagram illustrating a pixel arrangement of the display device with a touch detection function including the touch detection device according to the embodiment.

FIG. 17 is a diagram illustrating a display device with a touch detection function including the touch detection device according to the embodiment. FIG. 18 is a cross-sectional view illustrating the schematic cross-sectional structure of the display device with a touch detection function including the touch detection device according to the embodiment. FIG. 19 is a circuit diagram illustrating a pixel arrangement of the display device with a touch detection function including the touch detection device according to the embodiment. The display device with a touch detection function 7 includes a display unit with touch detection function 10, a control unit 11, a gate driver 12, a source driver 13, a drive unit 14 as a drive electrode driver, and a touch detection unit 40. The display device with a touch detection function 7 is a display device including a touch detection function of the touch detection device 1. The display device with a touch detection function 7 is namely an in-cell type device including a display unit with a touch detection function 10 in which a liquid crystal display section 20 that adopts a liquid crystal display element as a display element and an electrostatic capacitance touch detection section 30 included in the touch detection device 1 are integrated with each other. Alternatively, the display device with a touch detection function 7 may be an on-cell type device in which the electrostatic capacitance touch detection section 30 is mounted on the liquid crystal display section 20 that adopts a liquid crystal display element as a display element.

The liquid crystal display section 20 is a display that sequentially scans horizontal lines one by one and displays the scanned lines according to the scanning signal Vscan supplied from the gate driver 12, as described later. The control unit 11 is a micro computer, for example, that transmits control signals to the gate driver 12, the source driver 13, the drive unit 14, and the touch detection unit 40 according to a video signal Vdisp supplied externally, and controls them so as to operate in a synchronized manner to each other.

The gate driver 12 has a function for sequentially selecting horizontal lines one by one displayed and driven by the display device with a touch detection function 7 according to the control signal transmitted from the control unit 11. The source driver 13 is a circuit in the display device with a touch detection function 7 for transmitting a pixel signal Vpix to pixels Pix described later, according to the control signal transmitted from the control unit 11.

The drive unit 14 is a circuit in the display device with a touch detection function 7 for supplying the drive signal Vcom to a drive electrode COML of the display device with a touch detection function 7, which will be described later. As illustrated in FIGS. 18 and 19, the display device with a touch detection function 7 includes a pixel substrate 2, a counter substrate 3 disposed so as to be opposed to the pixel substrate 2, and a liquid crystal layer 6 provided between the pixel substrate 2 and the counter substrate 3.

The pixel substrate 2 has a thin film transistor (TFT) substrate 21 as a circuit substrate and a plurality of pixel electrodes 22 arranged on the TFT substrate 21 in a matrix. Provided on the TFT substrate 21 are thin film transistors (TFT) elements Tr of pixels Pix illustrated in FIG. 19, wiring such as pixel signal lines SGL that supply the pixel signals Vpix to the pixel electrode 22, and scanning signal lines GCL that drive the TFT elements Tr. The liquid crystal display section 20 illustrated in FIG. 19 has pixels Pix arranged in a matrix. Each of the pixels Pix includes the TFT elements Tr and liquid crystal devices LC. The TFT element Tr is a thin film transistor, achieved with an n-channel metal oxide semiconductor (MOS) TFT in this example. The source of the TFT elements Tr is electrically coupled to the pixel signal line SGL, the gate thereof is electrically coupled to the scanning signal line GCL, the drain thereof is electrically coupled to one end of the liquid crystal device LC. One end of the liquid crystal device LC is electrically coupled to the drain of the TFT element Tr and the other end thereof is electrically coupled to the drive electrode COML.

The scanning signal line GCL electrically couples a pixel Pix to another pixel Pix included in the same row of the liquid crystal display section 20. The scanning signal line GCL is electrically coupled to the gate driver 12. The gate driver 12 transmits the scanning signal Vscan to the scanning signal line GCL. The pixel signal line SGL electrically couples a pixel Pix to another pixel Pix included in the same column of the liquid crystal display section 20. The pixel signal line SGL is electrically coupled to the source driver 13. The source driver 13 transmits the pixel signal Vpix to the pixel signal line SGL. The drive electrode COML electrically couples a pixel Pix to another pixel Pix included in the same row of the liquid crystal display section 20. The drive electrode COML is electrically couples to the drive unit 14. The drive unit 14 transmits the drive signals Vcom (a display drive signal Vcomd and the signal for touch detection TSVcom) to the drive electrode COML. In other words, pixels Pix included in the same row share a single drive electrode COML, in this example.

The gate driver 12 illustrated in FIG. 17 applies the scanning signals Vscan through the scanning signal lines GCL illustrated in FIG. 19 to the gates of the TFT elements Tr of the pixels Pix, thereby sequentially selecting rows (horizontal lines) one by one out of the pixels Pix arranged in a matrix on the liquid crystal display section 20, as a target for driving for display. The source driver 13 illustrated in FIG. 17 transmits the pixel signals Vpix through the pixel signal lines SGL illustrated in FIG. 19 to the pixels Pix included in the horizontal lines sequentially selected one by one by the gate driver 12. In the pixels Pix, horizontal lines are displayed according to the transmitted pixel signals Vpix. The drive unit 14 illustrated in FIG. 17 applies the display drive signals Vcomd to the drive electrodes COML, thereby driving the drive electrode COML for each block including predetermined lines of drive electrodes COML illustrated in FIGS. 18 and 19.

As described above, in the liquid crystal display section 20, the gate driver 12 drives so as to sequentially scan the scanning signal lines GCL, thereby sequentially selecting the horizontal lines one by one. In the liquid crystal display section 20, the source driver 13 transmits the pixel signal Vpix to the pixel Pix included in the horizontal line, whereby display is performed for each horizontal line. For the display operation, the drive unit 14 applies the display drive signal Vcomd to the drive signal application block that includes the drive electrode COML corresponding to each horizontal line.

The counter substrate 3 includes a glass substrate 31, a color filter 32 provided on a plane of the glass substrate 31, and a plurality of drive electrodes COML provided on the surface of a color filter 32 on the opposite side of the glass substrate 31. On the other surface of the glass substrate 31, the touch detection electrode Rx serving as a detection electrode of the touch detection section 30 is provided. A polarizing plate 35 is provided on the touch detection electrode.

In the color filter 32, three color layers of red (R), green (G), and blue (B) are periodically arranged, for example. A group of the R, G, and B layers is associated with each of the above-described pixels Pix illustrated in FIG. 19.

The drive electrode COML functions as a common drive electrode of the liquid crystal display section 20 and also functions as a drive electrode of the touch detection section 30. That is, the drive electrode COML corresponds to the drive electrode Tx of the touch detection section 30. In the embodiment, one drive electrode COML is disposed so as to correspond to one pixel electrode 22 (the pixel electrode 22 included in a row). The drive electrode COML is configured such that the drive unit 14 applies drive signals Vcom (the display drive signal Vcomd and the above-described signal for touch detection TSVcom) with an AC rectangular waveform to the drive electrode COML through a not-illustrated contact conductive pole having conductivity.

The liquid crystal layer 6 modulates light passing through itself according to the state of the electric field, and uses various modes of liquid crystals such as a twisted nematic (TN) mode, a vertical alignment (VA) mode, and an electrically controlled birefringence (ECB) mode. An orientation film may be interposed between the liquid crystal layer 6 and the pixel substrate 2, and between the liquid crystal layer 6 and the counter substrate 3. An incident-side polarizing plate may be provided on the lower side of the pixel substrate 2.

The drive electrode COML functions as a common drive electrode of the liquid crystal display section 20 and also functions as the drive electrode Tx of the touch detection section 30. The drive signal Vcom therefore may influence on both of them. To address this, the drive electrode COML is applied in two different periods: a display operation period Pd in which a display operation is performed; and a touch detection operation period Pt in which a touch detection operation is performed. The drive unit 14 applies the display drive signal Vcomd as a drive signal Vcom in the display operation period Pd in which a display operation is performed. The drive unit 14 applies the signal for touch detection TSVcom as a drive signal Vcom in the touch detection operation period Pt in which a touch detection operation is performed.

The control unit 11 supplies control signals to the gate driver 12, the source driver 13, the drive unit 14, and the touch detection unit 40 based on the video signal Vdisp externally supplied so that they operate in a synchronized manner to each other. The gate driver 12 supplies the scanning signal Vscan to the liquid crystal display section 20 in the display operation period Pd and sequentially selects horizontal lines one by one as a target for driving for display. The source driver 13 supplies the pixel signal Vpix to each pixel Pix included in the horizontal line selected by the gate driver 12 in the display operation period Pd.

In the display operation period Pd, the drive unit 14 applies the display drive signal Vcomd as a drive signal Vcom to the drive electrode block relating to the horizontal line. In the touch detection operation period Pt, the drive unit 14 sequentially applies the signals for touch detection TSVcom as a drive signal Vcom, having a higher frequency than the display drive signals Vcomd to the drive electrode block relating to touch detection operations and sequentially selects detection blocks one by one.

The display device with a touch detection function 7 performs display operations according to the signals supplied from the gate driver 12, the source driver 13 and the drive unit 14 in the display operation period Pd. The display device with a touch detection function 7 detects touch operations according to signals supplied from the drive unit 14 in the touch detection operation period Pt and outputs the touch detection signal Vdet from the touch detection electrode Rx. The signal amplifier unit 42 amplifies the touch detection signal Vdet and outputs the amplified signal. The A/D converter 43 converts the analog signals output from the signal amplifier unit 42 into digital signals at the synchronized timing with the signal for touch detection TSVcom. The signal processing unit 44 detects the presence of touch operations on the touch detection section 30 according to an output signal of the A/D converter 43. If the signal processing unit 44 detects any touch operation, the coordinate extracting unit 45 obtains the coordinates of the touch detection device.

The display device with a touch detection function 7 includes the touch detection device 1 so as to detect touch operations reliably if the power supply voltage changes or a noise exists on the power line. In particular, if a single display device with a touch detection function 7 includes the liquid crystal display section 20 and the touch detection section 30 included in the touch detection device, the change in temperature and the change in the power supply voltage are larger than the case with the liquid crystal display section 20 or the touch detection section 30 used alone. Even in such an environment, it is preferable that the touch detection device 1 reliably detect touch operations.

2-2. Electronic Apparatuses

The flowing describes examples in which the above-described touch detection device 1 is applied to electronic apparatuses as application examples of an electronic apparatus according to the present disclosure.

FIGS. 20 to 31 are diagrams each illustrating an example of the electronic apparatus to which the touch detection device according to the embodiment is applied. The touch detection device 1 can be applied to electronic apparatuses in various fields, such as television devices, digital cameras, notebook personal computers, mobile terminal devices including mobile phones, and video cameras. In other words, the touch detection device 1 according to the embodiment can be applied to electronic apparatuses in various fields that display externally received video signals or internally generated video signals as images or video pictures.

Application Example 1

Figure 20:
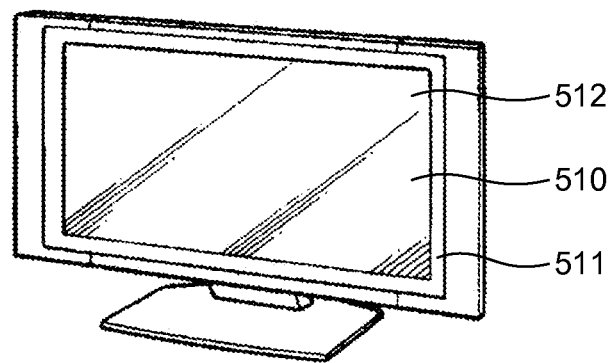
FIG. 20 is a diagram illustrating an example of an electronic apparatus including the touch detection device according to the embodiment.

The electronic apparatus illustrated in FIG. 20 is a television device to which the touch detection device 1 according to the embodiment is applied. This television device includes, for example, a video display screen unit 510 that includes a front panel 511 and a filter glass 512. The touch detection device 1 is applied to the video display screen unit 510. That is, the screen of the television device has a function for detecting touch operations in addition to a function for displaying images.

Application Example 2

Figure 21:
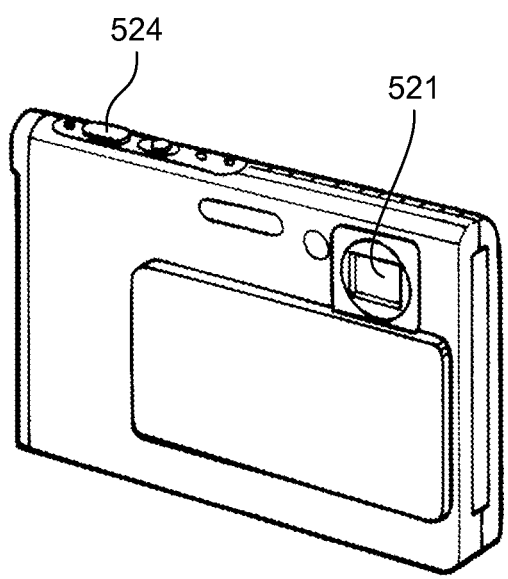
FIG. 21 is a diagram illustrating an example of an electronic apparatus including the touch detection device according to the embodiment.
Figure 22:
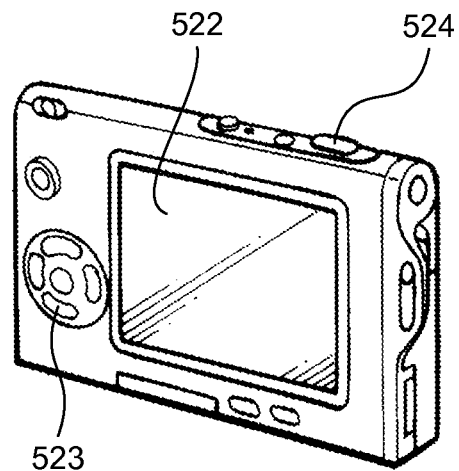
FIG. 22 is a diagram illustrating an example of an electronic apparatus including the touch detection device according to the embodiment.

The electronic apparatus illustrated in FIGS. 21 and 22 is a digital camera to which the touch detection device 1 according to the embodiment is applied. This digital camera includes, for example, a light-emitting unit 521 for flashing, a display unit 522, a menu switch 523, and a shutter button 524. The touch detection device 1 is applied to the display unit 522. That is, the display unit 522 of the digital camera has a function for detecting touch operations in addition to a function for displaying images.

Application Example 3

Figure 23:
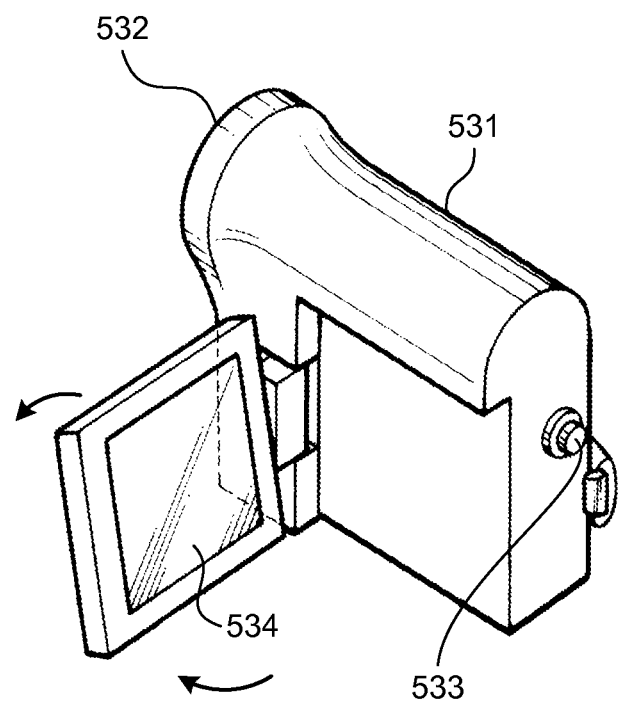
FIG. 23 is a diagram illustrating an example of an electronic apparatus including the touch detection device according to the embodiment.

The electronic apparatus illustrated in FIG. 23 represents an external appearance of a video camera to which the touch detection device 1 according to the embodiment is applied. This video camera includes, for example, a body 531, a lens 532 for capturing a subject provided on the front side face of the body 531, and a start/stop switch 533 and a display unit 534 that are used during shooting. The touch detection device 1 is applied to the display unit 534. That is, the display unit 534 of the video camera has a function for detecting touch operations in addition to a function for displaying images.

Application Example 4

Figure 24:
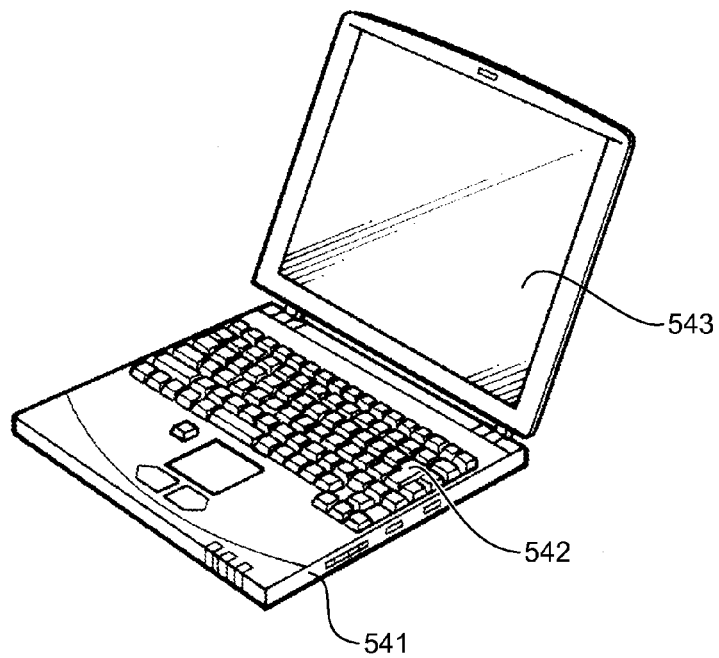
FIG. 24 is a diagram illustrating an example of an electronic apparatus including the touch detection device according to the embodiment.
Figure 25:
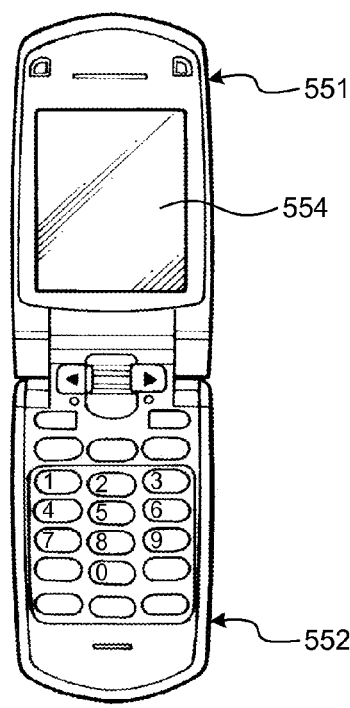
FIG. 25 is a diagram illustrating an example of an electronic apparatus including the touch detection device according to the embodiment.
Figure 26:
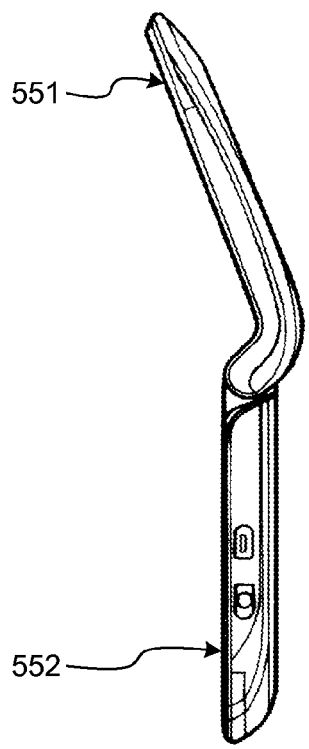
FIG. 26 is a diagram illustrating an example of an electronic apparatus including the touch detection device according to the embodiment.
Figure 27:
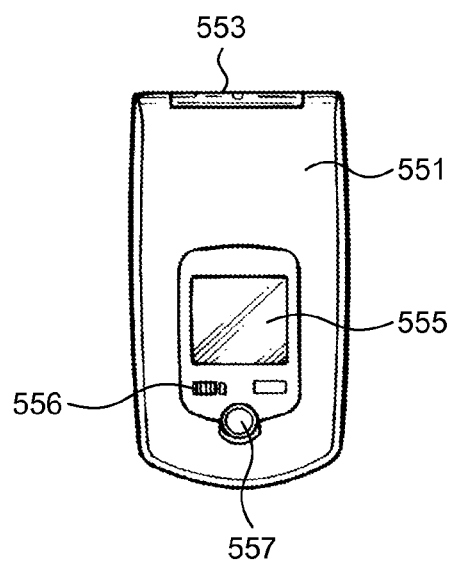
FIG. 27 is a diagram illustrating an example of an electronic apparatus including the touch detection device according to the embodiment.
Figure 28:
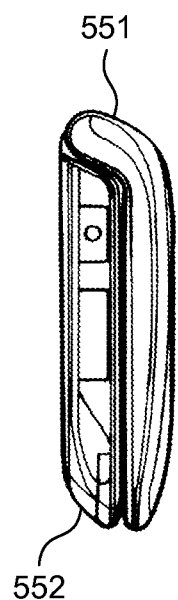
FIG. 28 is a diagram illustrating an example of an electronic apparatus including the touch detection device according to the embodiment.
Figure 29:
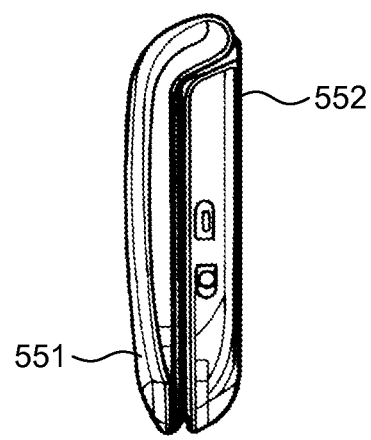
FIG. 29 is a diagram illustrating an example of an electronic apparatus including the touch detection device according to the embodiment.
Figure 30:
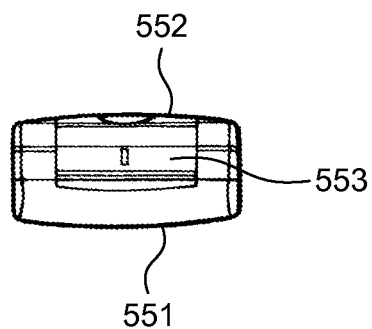
FIG. 30 is a diagram illustrating an example of an electronic apparatus including the touch detection device according to the embodiment.
Figure 31:
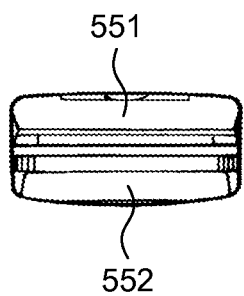
FIG. 31 is a diagram illustrating an example of an electronic apparatus including the touch detection device according to the embodiment.

The electronic apparatus illustrated in FIG. 24 is a notebook personal computer to which the touch detection device 1 according to the embodiment is applied. This notebook personal computer includes, for example, a body 541, a keyboard 542 for input operation of characters, etc., and a display unit 543 that displays images. The touch detection device 1 is applied to the display unit 543. That is, the display unit 543 of the notebook personal computer has a function for detecting touch operations in addition to a function for displaying images.

Application Example 5

The electronic apparatus illustrated in FIGS. 25 to 31 is a mobile phone to which the touch detection device 1 according to the embodiment is applied. This mobile phone includes, for example, an upper housing 551 and a lower housing 552 connected to each other with a connection unit (hinge unit) 553, and includes a display 554, a subdisplay 555, a picture light 556, and a camera 557. The touch detection device 1 is mounted on the display 554. That is, the display 554 of the mobile phone has a function for detecting touch operations in addition to a function for displaying images.

3. ASPECTS OF PRESENT DISCLOSURE

The present disclosure includes the following aspects:
(1) A Touch detection device comprising:
a drive unit that supplies an excitation signal having at least variable magnitude to a first electrode at a predetermined period for detecting approach or a touch of an object;
a detection unit electrically coupled to a second electrode provided to be opposed to the first electrode to detect approach or a touch of the object according to an output value from the second electrode; and
an element that electrically couples the drive unit and the detection unit, receives the excitation signal from the drive unit, and has a predetermined size of electrostatic capacitance, wherein
the touch detection device corrects an output value from the second electrode by using an output value from the element and the output value from the second electrode obtained at the same timing.
(2) The touch detection device according to (1), wherein the excitation signal is input to the first electrode and the element at the same timing.
(3) The Touch detection device according to (1), wherein
the excitation signal to be input to the first electrode is inverted and input to the element, and
the sum of the output value from the second electrode and the output value from the element is a correction value of the output value from the second electrode.
(4) The touch detection device according to (3), wherein the excitation signal to be input to the element is inverted by an inverter.
(5) The touch detection device according to (3), wherein the excitation signal to be input to the element is inverted by a circuit for inverting phases.
(6) The touch detection device according to (1), wherein
the excitation signal from the drive unit is input to the first electrode and the element with the same phase, and
after an electric charge in the element is temporarily stored and an electric charge from the second electrode is temporarily stored, a difference between the electric charges is obtained, and the obtained difference is used as a correction value of the output value from the second electrode.
(7) The touch detection device according to (1), wherein the element is disposed close to the detection unit.
(8) The touch detection device according to (7), wherein the element is mounted on a substrate on which the detection unit is mounted.
(9) The touch detection device according to (1), wherein wiring that electrically couples the element and the drive unit is longer than wiring that electrically couples the element and the detection unit.
(10) The touch detection device according to (1), wherein the detection unit and drive unit are separated from each other as individual electronic parts.
(11) The touch detection device according to (1), wherein the electronic part is an integral circuit or an integral circuit package.
(12) A display device with a touch detection function having a touch detection device, the touch detection device comprising:

a drive unit that supplies an excitation signal having at least variable magnitude to a first electrode at a predetermined period for detecting approach or a touch of an object;

a detection unit electrically coupled to a second electrode provided to be opposed to the first electrode to detect approach or a touch of the object according to an output value from the second electrode; and an element that electrically couples the drive unit and the detection unit, receives the excitation signal from the drive unit, and has a predetermined size of electrostatic capacitance, wherein the touch detection device corrects an output value from the second electrode by using an output value from the element and the output value from the second electrode obtained at the same timing.

(13) An electronic apparatus having a touch detection device, the touch detection device comprising:

a drive unit that supplies an excitation signal having at least variable magnitude to a first electrode at a predetermined period for detecting approach or a touch of an object;

a detection unit electrically coupled to a second electrode provided to be opposed to the first electrode to detect approach or a touch of the object according to an output value from the second electrode; and an element that electrically couples the drive unit and the detection unit, receives the excitation signal from the drive unit, and has a predetermined size of electrostatic capacitance, wherein the touch detection device corrects an output value from the second electrode by using an output value from the element and the output value from the second electrode obtained at the same timing.

The present disclosure can provide a touch detection device, a display device with a touch detection function, and an electronic apparatus capable of suppressing reduction of detection accuracy of an approach or a touch of an object.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A touch detection device comprising:
a drive unit that supplies an excitation signal having at least variable magnitude to a first electrode at a predetermined period for detecting approach or a touch of an object;
a detection unit electrically coupled to a second electrode provided to be opposed to the first electrode to detect approach or a touch of the object according to an output value from the second electrode; and
an element that electrically couples the drive unit and the detection unit, receives the excitation signal from the drive unit, and has a predetermined size of electrostatic capacitance,
wherein the touch detection device is configured to correct an output value from the second electrode by using an output value from the element and the output value from the second electrode obtained at the same timing, and
wherein the excitation signal to be input to the first electrode is inverted and input to the element, and the sum of the output value from the second electrode and the output value from the element is a correction value of the output value from the second electrode.

2. The touch detection device according to claim 1, wherein the excitation signal is input to the first electrode and the element at the same timing.

3. The touch detection device according to claim 1, wherein the excitation signal to be input to the element is inverted by an inverter.

4. The touch detection device according to claim 1, wherein the excitation signal to be input to the element is inverted by a circuit for inverting phases.

5. The touch detection device according to claim 1, wherein
the excitation signal from the drive unit is input to the first electrode and the element with the same phase, and
after an electric charge in the element is temporarily stored and an electric charge from the second electrode is temporarily stored, a difference between the electric charges is obtained, and the obtained difference is used as a correction value of the output value from the second electrode.

6. The touch detection device according to claim 1, wherein the element is disposed close to the detection unit.

7. The touch detection device according to claim 1, wherein the element is mounted on a substrate on which the detection unit is mounted.

8. The touch detection device according to claim 1, wherein wiring that electrically couples the element and the drive unit is longer than wiring that electrically couples the element and the detection unit.

9. The touch detection device according to claim 1, wherein the detection unit and drive unit are separated from each other as individual electronic parts.

10. The touch detection device according to claim 9, wherein the electronic part is an integral circuit or an integral circuit package.

11. A display device with a touch detection function having a touch detection device, the touch detection device comprising:
a drive unit that supplies an excitation signal having at least variable magnitude to a first electrode at a predetermined period for detecting approach or a touch of an object;
a detection unit electrically coupled to a second electrode provided to be opposed to the first electrode to detect approach or a touch of the object according to an output value from the second electrode; and
an element that electrically couples the drive unit and the detection unit, receives the excitation signal from the drive unit, and has a predetermined size of electrostatic capacitance,
wherein the touch detection device is configured to correct an output value from the second electrode by using an output value from the element and the output value from the second electrode obtained at the same timing, and
wherein the excitation signal to be input to the first electrode is inverted and input to the element, and the sum of the output value from the second electrode and the output value from the element is a correction value of the output value from the second electrode.

12. An electronic apparatus having a touch detection device, the touch detection device comprising:
a drive unit that supplies an excitation signal having at least variable magnitude to a first electrode at a predetermined period for detecting approach or a touch of an object;
a detection unit electrically coupled to a second electrode provided to be opposed to the first electrode to detect approach or a touch of the object according to an output value from the second electrode; and an element that electrically couples the drive unit and the detection unit, receives the excitation signal from the drive unit, and has a predetermined size of electrostatic capacitance, wherein the touch detection device is configured to correct an output value from the second electrode by using an output value from the element and the output value from the second electrode obtained at the same timing, and wherein the excitation signal to be input to the first electrode is inverted and input to the element, and the sum of the output value from the second electrode and the output value from the element is a correction value of the output value from the second electrode.

13. A touch detection device comprising:

a drive unit that supplies an excitation signal having at least variable magnitude to a first electrode at a predetermined period for detecting approach or a touch of an object;

a detection unit electrically coupled to a second electrode provided to be opposed to the first electrode to detect approach or a touch of the object according to an output value from the second electrode; and an element that electrically couples the drive unit and the detection unit, receives the excitation signal from the drive unit, and has a predetermined size of electrostatic capacitance, wherein the touch detection device is configured to correct an output value from the second electrode by using an output value from the element and the output value from the second electrode obtained at the same timing, wherein the excitation signal from the drive unit is input to the first electrode and the element with the same phase, and wherein after an electric charge in the element is temporarily stored and an electric charge from the second electrode is temporarily stored, a difference between the electric charges is obtained, and the obtained difference is used as a correction value of the output value from the second electrode.

14. The touch detection device according to claim 13, wherein the excitation signal is input to the first electrode and the element at the same timing.

15. The touch detection device according to claim 13, wherein the excitation signal to be input to the first electrode is inverted and input to the element, and the sum of the output value from the second electrode and the output value from the element is a correction value of the output value from the second electrode.

16. The touch detection device according to claim 15, wherein the excitation signal to be input to the element is inverted by an inverter.

17. The touch detection device according to claim 15, wherein the excitation signal to be input to the element is inverted by a circuit for inverting phases.

18. The touch detection device according to claim 13, wherein the element is disposed close to the detection unit.

19. The touch detection device according to claim 13, wherein the element is mounted on a substrate on which the detection unit is mounted.

20. The touch detection device according to claim 13, wherein wiring that electrically couples the element and the drive unit is longer than wiring that electrically couples the element and the detection unit.

21. The touch detection device according to claim 13, wherein the detection unit and drive unit are separated from each other as individual electronic parts.

22. The touch detection device according to claim 21, wherein the electronic part is an integral circuit or an integral circuit package.

23. A display device with a touch detection function having a touch detection device, the touch detection device comprising:

a drive unit that supplies an excitation signal having at least variable magnitude to a first electrode at a predetermined period for detecting approach or a touch of an object;

a detection unit electrically coupled to a second electrode provided to be opposed to the first electrode to detect approach or a touch of the object according to an output value from the second electrode; and an element that electrically couples the drive unit and the detection unit, receives the excitation signal from the drive unit, and has a predetermined size of electrostatic capacitance, wherein the touch detection device is configured to correct an output value from the second electrode by using an output value from the element and the output value from the second electrode obtained at the same timing, wherein the excitation signal from the drive unit is input to the first electrode and the element with the same phase, and wherein after an electric charge in the element is temporarily stored and an electric charge from the second electrode is temporarily stored, a difference between the electric charges is obtained, and the obtained difference is used as a correction value of the output value from the second electrode.

24. An electronic apparatus having a touch detection device, the touch detection device comprising:

a drive unit that supplies an excitation signal having at least variable magnitude to a first electrode at a predetermined period for detecting approach or a touch of an object;

a detection unit electrically coupled to a second electrode provided to be opposed to the first electrode to detect approach or a touch of the object according to an output value from the second electrode; and an element that electrically couples the drive unit and the detection unit, receives the excitation signal from the drive unit, and has a predetermined size of electrostatic capacitance, wherein the touch detection device is configured to correct an output value from the second electrode by using an output value from the element and the output value from the second electrode obtained at the same timing, wherein the excitation signal from the drive unit is input to the first electrode and the element with the same phase, and wherein after an electric charge in the element is temporarily stored and an electric charge from the second electrode is temporarily stored, a difference between the electric charges is obtained, and the obtained difference is used as a correction value of the output value from the second electrode.

* * * * *